US012527932B2

(12) United States Patent
Harnish

(10) Patent No.: US 12,527,932 B2
(45) Date of Patent: Jan. 20, 2026

(54) ENDOTRACHEAL TUBE APPARATUS AND METHODS

(71) Applicant: WarriorNP LLC, Bloomfield Hills, MI (US)

(72) Inventor: Jessica Harnish, Bloomfield Hills, MI (US)

(73) Assignee: WarriorNP LLC, Bloomfiled Hills, MI (US)

( * ) Notice: Subject to any disclaimer, the term of this patent is extended or adjusted under 35 U.S.C. 154(b) by 833 days.

(21) Appl. No.: 17/877,709

(22) Filed: Jul. 29, 2022

(65) Prior Publication Data

US 2023/0031571 A1   Feb. 2, 2023

Related U.S. Application Data

(60) Provisional application No. 63/304,253, filed on Jan. 28, 2022, provisional application No. 63/293,485, filed on Dec. 23, 2021, provisional application No. 63/227,306, filed on Jul. 29, 2021.

(51) Int. Cl.
*A61M 16/04* (2006.01)
*A61M 25/02* (2006.01)

(52) U.S. Cl.
CPC .... *A61M 16/0497* (2013.01); *A61M 16/0463* (2013.01); *A61M 2025/024* (2013.01); *A61M 2209/088* (2013.01)

(58) Field of Classification Search
CPC ................................................ A61M 16/0497
See application file for complete search history.

(56) References Cited

U.S. PATENT DOCUMENTS

| | | | |
|---|---|---|---|
| 3,760,811 A | 9/1973 | Andrew | |
| 4,193,174 A | 3/1980 | Stephens | |
| 4,249,529 A | 2/1981 | Nestor et al. | |
| 4,326,515 A | 4/1982 | Shaffer et al. | |
| 4,351,331 A | 9/1982 | Gereg | |
| 4,744,358 A | 5/1988 | McGinnis | |
| 4,867,154 A | 9/1989 | Potter et al. | |
| 5,009,227 A * | 4/1991 | Nieuwstad | A61M 16/0497 128/207.14 |
| 5,069,206 A | 12/1991 | Crosbie | |
| 5,295,480 A | 3/1994 | Zemo | |
| 5,479,921 A | 1/1996 | Reif | |
| 5,485,837 A | 1/1996 | Solesbee et al. | |

(Continued)

FOREIGN PATENT DOCUMENTS

CN  108159561 B   5/2021
EP   1062963 A2  12/2000

(Continued)

OTHER PUBLICATIONS

International Search Report for International Application No. PCT/US2022/038932 dated Nov. 15, 2022.

*Primary Examiner* — Bradley H Philips
(74) *Attorney, Agent, or Firm* — Carlson, Gaskey & Olds, P.C

(57) ABSTRACT

An endotracheal tube apparatus according to an example of this disclosure includes a brace for attachment to a patient's face, a support extending from the brace and including a groove for receiving an endotracheal tube. A clamp surrounds the support and the endotracheal tube. The clamp is comprised of a polymeric material.

20 Claims, 42 Drawing Sheets

(56) References Cited

U.S. PATENT DOCUMENTS

| | | | |
|---|---|---|---|
| 5,653,232 A | | 8/1997 | Rogers et al. |
| 5,672,179 A | | 9/1997 | Garth et al. |
| 5,806,516 A | | 9/1998 | Beattie |
| 6,029,668 A | | 2/2000 | Freed |
| 6,050,263 A | * | 4/2000 | Choksi ............ A61M 16/0488 |
| | | | 128/207.14 |
| D434,496 S | | 11/2000 | Choksi et al. |
| 6,298,525 B1 | | 10/2001 | Margo |
| 6,526,978 B2 | | 3/2003 | Dominguez |
| 6,755,191 B2 | | 6/2004 | Bertoch et al. |
| 8,267,370 B2 | | 9/2012 | Fisher et al. |
| 10,398,629 B1 | | 9/2019 | Spironello |
| 10,500,361 B2 | | 12/2019 | Phillips et al. |
| 10,512,768 B2 | | 12/2019 | Tsukamoto et al. |
| 10,888,680 B2 | | 1/2021 | Zickefoose et al. |
| 2007/0261214 A1 | | 11/2007 | Nerbonne et al. |
| 2014/0261462 A1 | * | 9/2014 | Visconti ................ A61C 5/90 |
| | | | 128/861 |
| 2018/0344960 A1 | | 12/2018 | Kaneyasu |

FOREIGN PATENT DOCUMENTS

| | | | | |
|---|---|---|---|---|
| EP | 3542845 A1 | | 9/2019 | |
| WO | WO-9611029 A1 | * | 4/1996 | ........ A61M 16/0497 |
| WO | 2012111310 A1 | | 8/2012 | |
| WO | 2016114643 A1 | | 7/2016 | |
| WO | 2018071804 A2 | | 4/2018 | |
| WO | 2018091753 A1 | | 5/2018 | |
| WO | WO-2019178477 A1 | * | 9/2019 | ........ A61M 16/0497 |
| WO | 2019224217 A1 | | 11/2019 | |

\* cited by examiner

ENDOTRACHEAL TUBE APPARATUS AND METHODS

CROSS-REFERENCED TO RELATED APPLICATION

This application claims priority to U.S. Provisional Application No. 62/227,306, which was filed on Jul. 29, 2021, and U.S. Provisional Application No. 62/293,485, which was filed on Dec. 23, 2021, and U.S. Provisional Application No. 63/304,253, which was filed on Jan. 28, 2022.

BACKGROUND

Endotracheal intubation is a medical procedure in which a flexible tube is placed through the mouth or nose into the windpipe (trachea) to help a patient breathe. In some instances, endotracheal intubation is an emergency procedure that is performed on a patient who may be unconscious or who cannot breathe on their own.

Nasogastric tubes or orogastric tubes are small tubes placed either through the nose or the mouth and end with the tip in the stomach or the small intestines. Nasogastric tubes or orogastric tubes may be used for feedings, medication administration, or removal of contents from the stomach via aspiration, suction, or gravity drainage.

Gastric suction is a procedure to empty the contents of your stomach. Gastric suction is performed to empty the contents of the stomach before it passes through the rest of the digestive tract.

SUMMARY

An endotracheal tube apparatus according to an example of this disclosure includes a brace for attachment to a patient's face, a support extending from the brace and including a groove for receiving an endotracheal tube. A clamp surrounds the support and the endotracheal tube. The clamp is comprised of a polymeric material.

In a further example of the foregoing, the clamp includes a plastic body.

In a further example of any of the foregoing, the clamp is generally C-shaped.

In a further example of any of the foregoing, the clamp includes an open circumferential portion.

In a further example of any of the foregoing, the support includes a second groove configured to receive a second tube.

In a further example of any of the foregoing, the second tube is a feeding tube or a gastric suction tube.

In a further example of any of the foregoing, the support includes a third groove. The first, second, and third grooves are sized differently, and the third groove is closer circumferentially to the second groove than the first groove.

In a further example of any of the foregoing, the open circumferential portion is sized such that it is received over a radially outer surface of the support when tubes are to be secured in the first and second groove.

In a further example of any of the foregoing, the open circumferential portion has an arc length greater than or equal to the arc length of the largest groove, and the open circumferential portion arc length is less than the arc length of at least one of the radially outer surfaces of the support.

In a further example of any of the foregoing, the first and second groove are positioned such that when the endotracheal tube is to be adjusted or replaced, the clamp can be rotated in a clockwise or counterclockwise direction so that the open circumferential portion is circumferentially aligned with the first groove, while the clamp secures the second tube in the second groove.

In a further example of any of the foregoing, the first and second groove are positioned such that when the second tube is to be adjusted or replaced, the clamp can be rotated in a clockwise or counterclockwise direction so that the open circumferential portion is circumferentially aligned with the second groove, while the clamp secures the endotracheal tube in the first groove.

A method of intubating a patient according to an example of this disclosure includes attaching a brace to the patient's face. The brace includes a support extending away from the patient's face. An endotracheal tube is clamped within a groove of the support with a clamp that surrounds the endotracheal tube and the support. The clamp is comprised of a polymeric material.

In a further example of the foregoing, the clamp is generally C-shaped.

In a further example of any of the foregoing, the clamp includes an open circumferential portion.

In a further example of any of the foregoing, the support includes a second groove, which is configured to receive a second tube. The second tube is a feeding tube or a gastric suction tube. The method further includes clamping the second tube within the second groove with the clamp.

In a further example of any of the foregoing, the open circumferential portion is sized such that it is received over a radially outer surface of the support when the endotracheal and second tubes are secured in the first and second groove In a further example of any of the foregoing, the open circumferential portion has an arc length greater than the arc length of the largest groove.

In a further example of any of the foregoing, the open circumferential portion arc length is less than the arc length of at least one of the radially outer surfaces of the support.

In a further example of any of the foregoing, the method includes adjusting or replacing the endotracheal tube. The first and second groove are positioned such that when the endotracheal tube is to be adjusted or replaced, the adjusting or replacing includes rotating the clamp in a clockwise or counterclockwise direction so that the open circumferential portion is circumferentially aligned with the first groove, while the clamp secures the second tube in the second groove.

In a further example of any of the foregoing, the method includes adjusting or replacing the second tube. The first and second groove are positioned such that when the second tube is to be adjusted or replaced, the adjusting or replacing includes rotating the clamp in a clockwise or counterclockwise direction so that the open circumferential portion is circumferentially aligned with the second groove, while the clamp secures the endotracheal tube in the first groove.

These and other features may be best understood from the following specification and drawings, the following of which is a brief description.

DETAILED DESCRIPTION

This application is related to apparatuses and methods for supporting endotracheal, feeding, and/or gastric suction tubes. In some prior art apparatuses, tape is used to secure the tube, such as an endotracheal tube, to a brace. Applicant has identified certain disadvantages of using tape. When infants are intubated and premature, they are often subjected to humidity for 30 or more days, which can make the tape less effective at securing and possibly lead to the tube coming out of position. Another drawback of tape is that medical professionals often have to remove their gloves before taping, removing the tape, or adjusting the tape, adding time and difficulty to the procedure. Still another drawback of tape is that intubated infants often vomit, which also can make the tape less effective at securing if the vomit contacts the tape. Yet another drawback of these prior art devices is that they often require 2-3 medical professionals to perform adjustments.

The example clamps and associated apparatuses and methods disclosed herein overcome the Applicant-identified disadvantages with prior art apparatuses, including those that use tape. For example, clamps with polymeric and/or elastomeric materials for securing a tube to a brace are relatively unaffected by humidity and vomit. Further, clamps with polymeric and/or elastomeric materials are easy to quickly adjust. In some examples, the clamps may lack metal so that patients can undergo procedures such as magnetic resonance imaging while remaining intubated. In some examples, the braces, clamps, and/or supports disclosed herein may be plastic. In some examples, the braces, clamps, and/or supports disclosed herein may be made of medical grade polypropylene. Further, the examples disclosed herein allow a single medical professional to make an adjustment. Examples disclosed further eliminate the need for paper or plastic tape measures to be placed against the lip of the patient for measuring and adjusting tube depth.

Further, the examples disclosed herein allow multiple tubes to be secured with one clamp at once, and further allow one of those tubes to be selectively removed or adjusted while the other tube remains secured, i.e., held in place longitudinally to control the depth of the tube in the patient. The benefits described herein are not limited to intubation procedures and may be achieved by other procedures, including feeding or gastric suction tube procedures. Further, while procedures regarding infants are described in some of the example embodiments, procedures for other patients of various ages may benefit from this disclosure.

Figure 1:
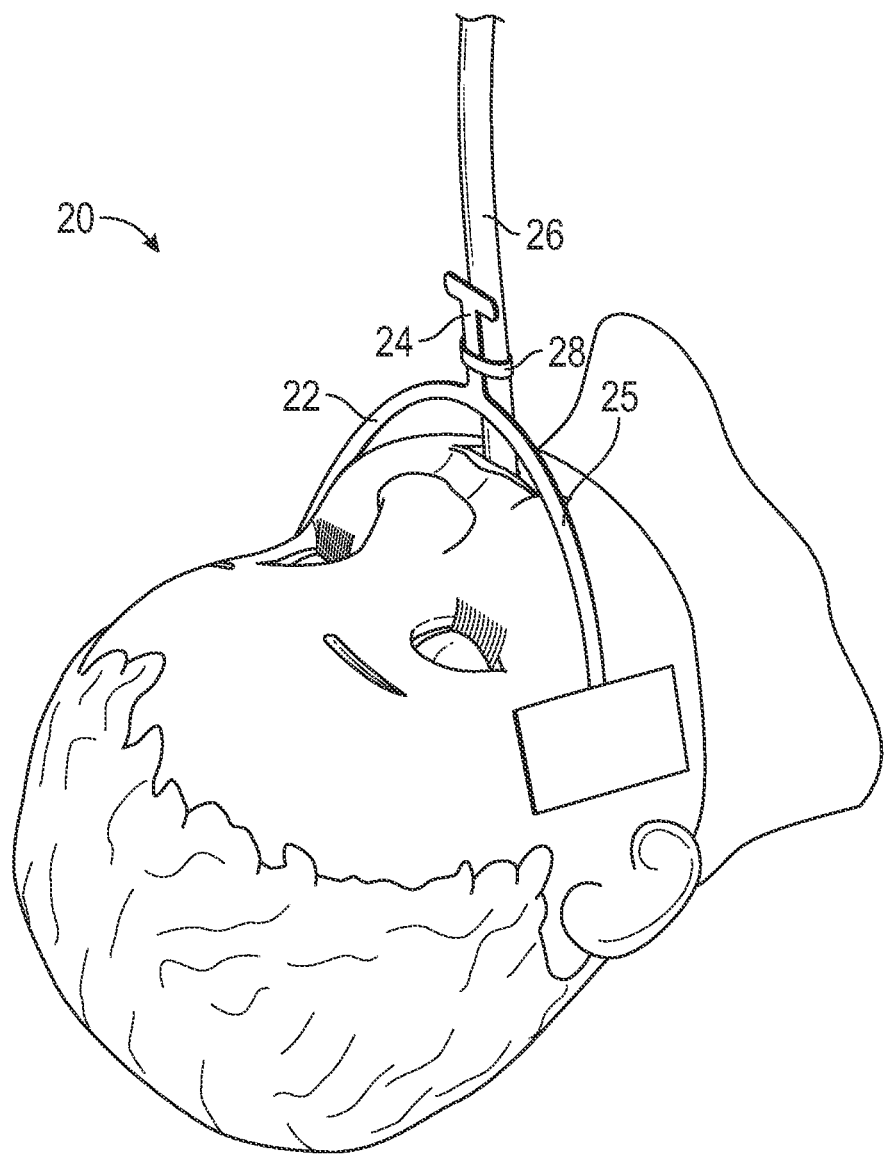
FIG. 1 illustrates an example endotracheal tube support apparatus.

FIG. 1 illustrates an example endotracheal tube support apparatus 20 including a brace 22 for attachment to a patient's face. The brace 22 may include a support 24 extending away from the patient's face as shown. The example support 24 extends from a curved portion 25 that is contoured to complement the patient's face and secured to the patient's face at its ends. An endotracheal tube 26 is received against the support 24 and placed through the mouth of the patient. A clamp 28 is provided to secure the tube 26 to the support 24 and surrounds both the tube 26 and the support 24. The example clamp 28 is made of one or more polymeric materials. The term polymer is used herein to refer generally to plastics, elastomers, thermoplastic elastomers, or other natural or synthetic materials that contain repeating molecule subunits. In some examples, the clamp 28 is plastic.

In the example shown, the patient is a newborn child, but intubations of other patients of various ages may benefit from this disclosure. Because of the small size of newborn children, the slightest adjustment in position of the tube can mean the difference of the infant receiving oxygen and not receiving oxygen. Accordingly, the examples disclosed herein provide improved securement of the endotracheal tube. Additionally, procedures involving nasogastric tubes, orogastric tubes, and gastric suction may benefit from this disclosure.

In some prior art apparatuses, tape is used to secure the endotracheal tube to the brace. Applicant has identified certain disadvantages of using tape. When infants are intubated, they are often subjected to humidity, which can make the tape less effective at securing and possibly lead to the tube coming out of position. Another drawback of tape is that medical professionals often have to remove their gloves before taping, removing the tape, or adjusting the tape, adding time and difficulty to the procedure. Still another drawback of tape is that intubated infants often vomit, which also can make the tape less effective at securing if the vomit contacts the tape.

Figure 2:
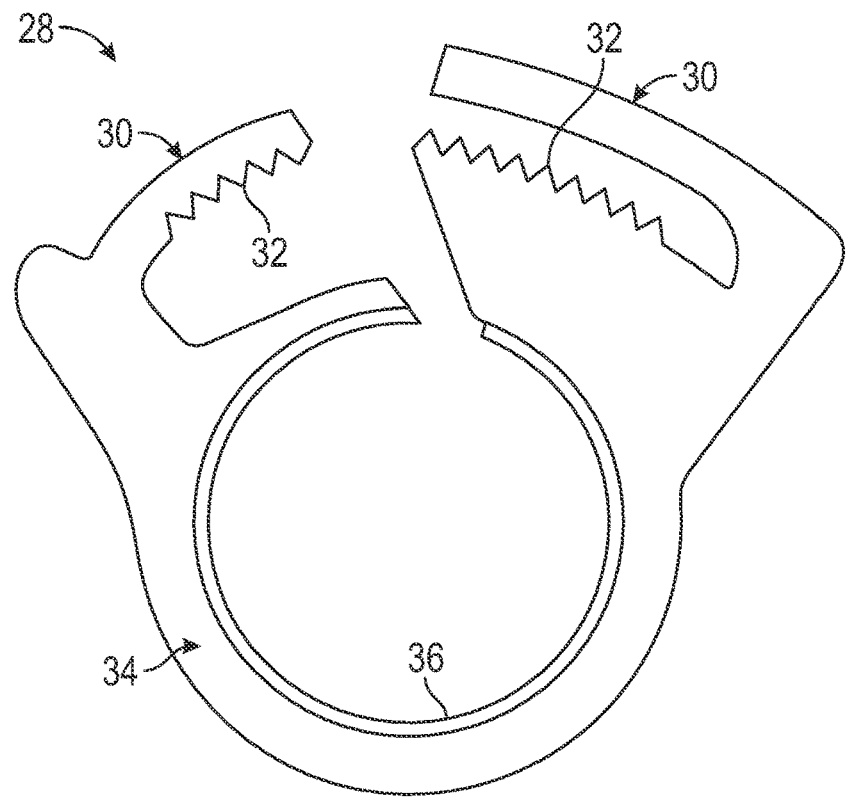
FIG. 2 illustrates an example clamp for an endotracheal tube support apparatus.

FIG. 2 illustrates one example clamp 28. The clamp 28 may include opposing finger portions 30, and each finger portion 30 may provide a respective ratchet surface 32 for engaging a ratchet surface 32 of the other finger portion 30. The ratchet surfaces 32 may be utilized to achieve adjustable tightness and securement of the clamp 28. In some examples, as shown, the clamp 28 includes a plastic outer portion 34 at its outer diameter and an elastomeric inner portion 36 at its inner diameter. The elastomeric inner portion 36 may be compressible and/or may have a higher coefficient of friction than the plastic so as to be securely received against at least one of the endotracheal tube 26 and the support 24 (see FIG. 1) for secure clamping.

Figure 3:
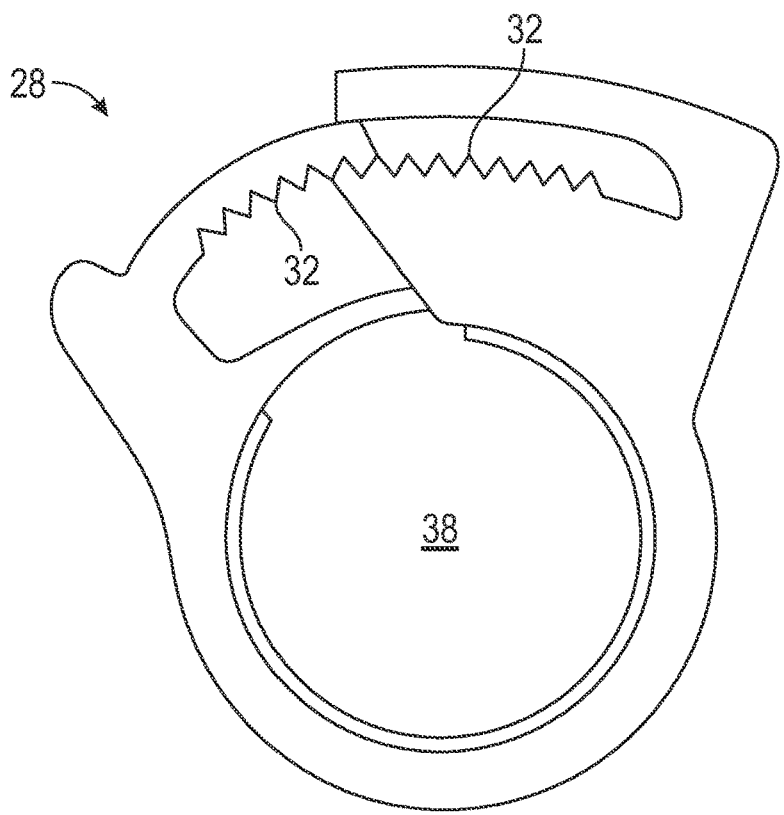
FIG. 3 illustrates the example clamp of FIG. 2 in an engaged position.

FIG. 3 illustrates the example clamp 28 of FIG. 2 in an engaged position, with respective ratchet surfaces 32 engaged. A substantially cylindrical opening 38 may be provided at the inner diameter to accommodate the support 24 and tube 26 (see FIG. 1).

Figure 4:
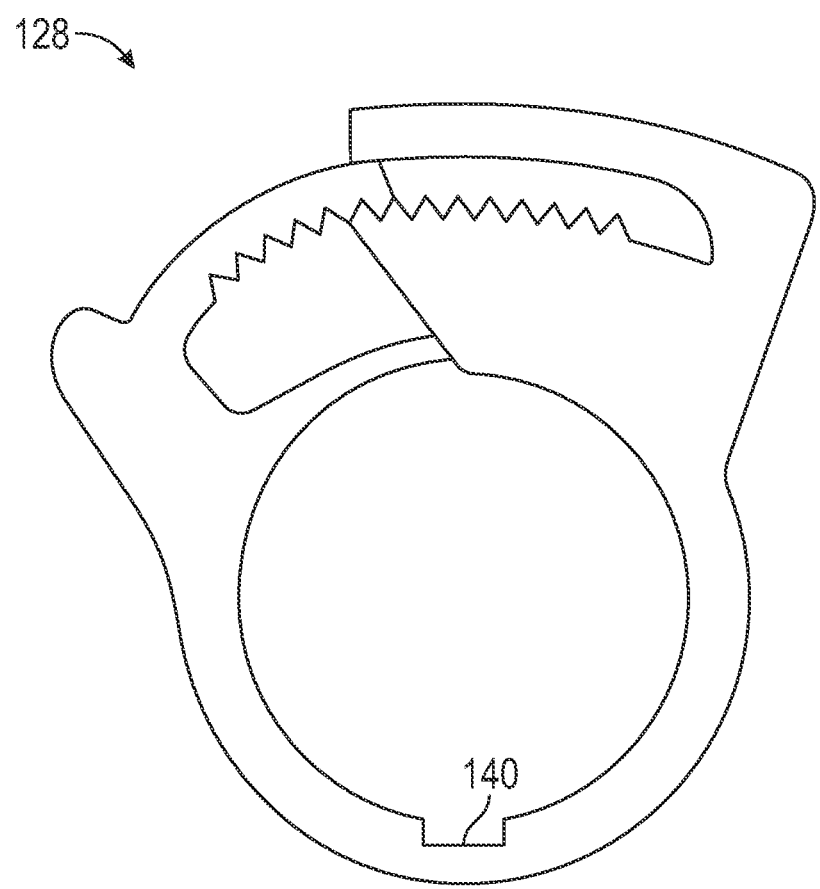
FIG. 4 illustrates another example clamp.

In another example, as shown in FIG. 4, and with reference to FIG. 1, the inner diameter of the clamp 128 is contoured to complement the shape of the tube 26 and support 24, such as by providing a groove 140 to receive the support 124. It should be understood that like reference numerals identify corresponding or similar elements throughout the several drawings.

Figure 5:
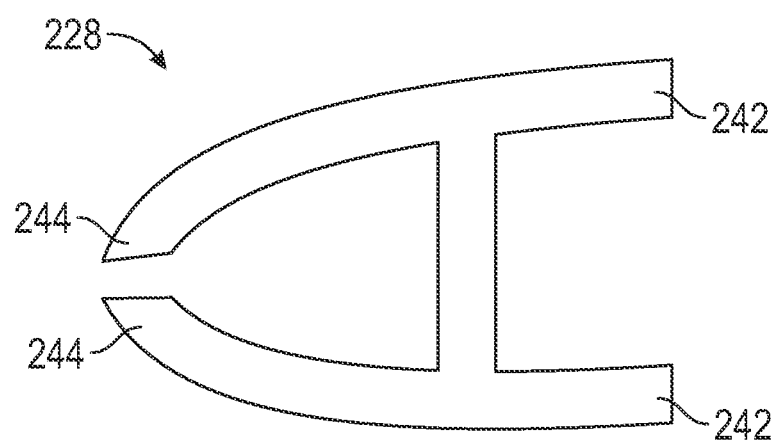
FIG. 5 illustrates yet another example clamp.

FIG. 5 illustrates another example clamp 228 including backside tabs 242 that can be pinched to open and close to moving opposing fingers 244 that may surround the tube 26 and support 24 (FIG. 1).

Like the examples shown in FIGS. 2 and 3, the example clamps 128/228 of FIGS. 4 and 5 may include polymeric and/or elastomeric materials. Although exemplary clamp designs are shown in FIGS. 2-5, other clamp designs, including those having similar materials, and including those additional examples discussed below, are contemplated. Although the example clamps are disclosed as used with one example brace 22, the clamps disclosed herein may be utilized with other braces.

Figure 6:
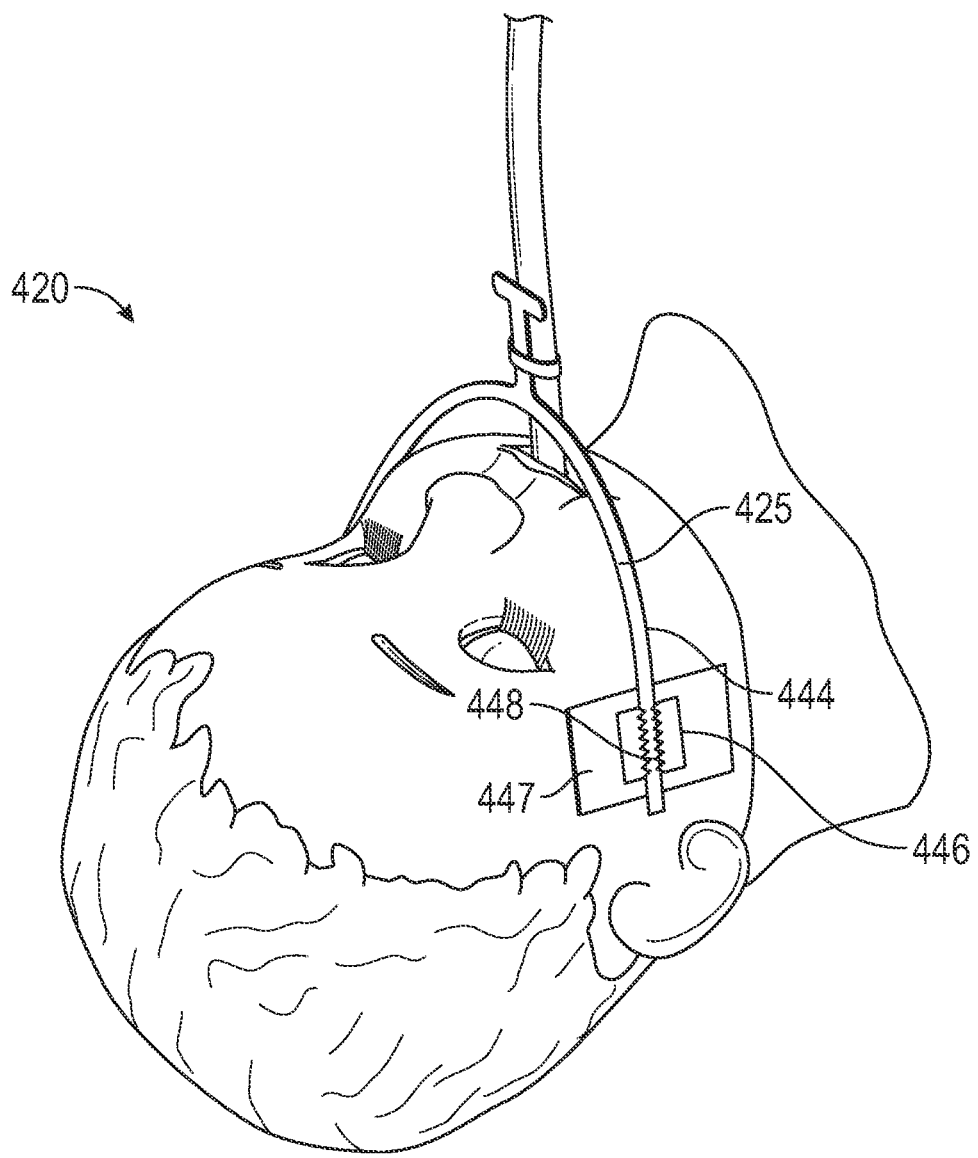
FIG. 6 illustrates another example endotracheal tube support apparatus.

FIG. 6 illustrates another example endotracheal tube support apparatus 420. The curved portion 425 includes a ratchet surface 444 that may be received in a bracket 446 on a pad 447 for attachment to the patient's face. The bracket 446 includes an opposing ratchet surface 448 for engaging the surface 444. The example apparatus 420 is therefore adjustable to accommodate patient faces of various sizes and shapes.

Additionally or alternatively, in some examples, the curved portion 425 may include two or more ratcheting portions (not shown) that adjust relative to one another for similar adjustability. Additionally or alternatively, in some examples, the pad 447 attaches to a second pad (not shown), such as by a hook and loop engagement, and the second pad is attached to the patient's face. Although one pad 447 is shown in the drawing, there may be one or more pads at each end of the curved portion 425.

An example method of intubating a patient may be said to include attaching a brace to the patient's face. The brace may include a support extending away from the patient's face. The example method may include clamping an endotracheal tube to the support with a clamp that surrounds the endotracheal tube and the support, and the clamp may include a polymeric material.

Figure 7:
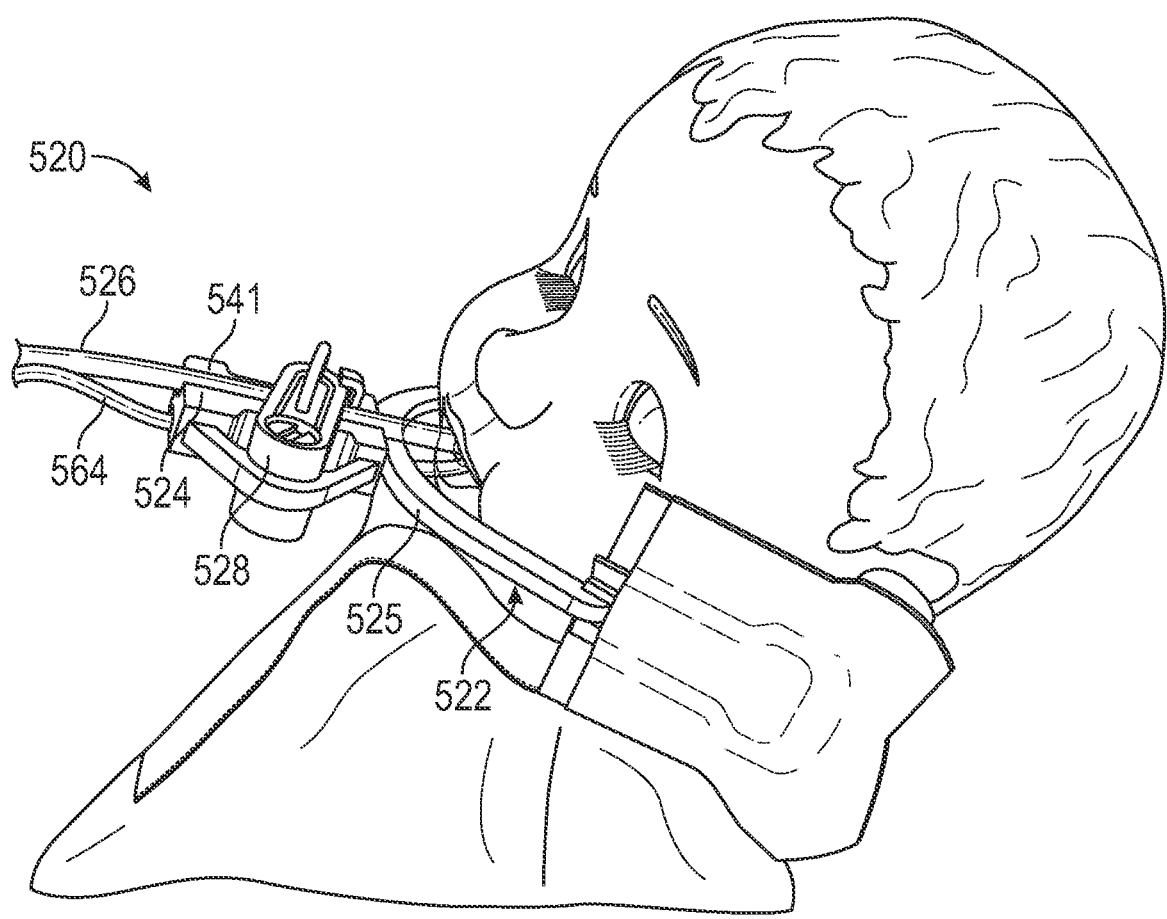
FIG. 7 illustrates another example endotracheal tube support apparatus.

FIG. 7 illustrates an example endotracheal tube support apparatus 520 including a brace portion 522 for attachment to a patient's face. A support 524 extends from the brace portion 522 and away from the patient's face as shown. The example support 524 extends from a curved portion 525 that is contoured to complement the patient's face and secured to the patient's face at its ends, such as by adhesive pads in some examples. An endotracheal tube 526 is received against the support 524 and may be inserted through the mouth of the patient in an intubation process.

A clamp 528 is provided to secure the tube 526 against movement relative to the support 524. In some examples, the endotracheal tube support apparatus 520 may be manufactured using additive manufacturing. In some examples, the endotracheal tube support apparatus 520, including the example clamp 528, is made of one or more polymeric materials. The term polymer is used herein to refer generally to plastics, elastomers, thermoplastic elastomers, or other natural or synthetic materials that contain repeating molecule subunits. In some examples, the clamp the endotracheal tube support apparatus 520, or at least portions thereof including the example clamp 528, is plastic. In some examples, the endotracheal tube support apparatus 520, or at least portions thereof including the example clamp 528, is made of Acrylonitrile butadiene styrene.

In the example shown, the patient is a newborn child, but endotracheal intubations of other patients of various ages may benefit from this disclosure. Because of the small size of newborn children, the slightest adjustment in position of the endotracheal tube can mean the difference of the infant receiving oxygen and not receiving oxygen. Accordingly, the examples disclosed herein provide improved securement of the endotracheal tube.

Figure 8:
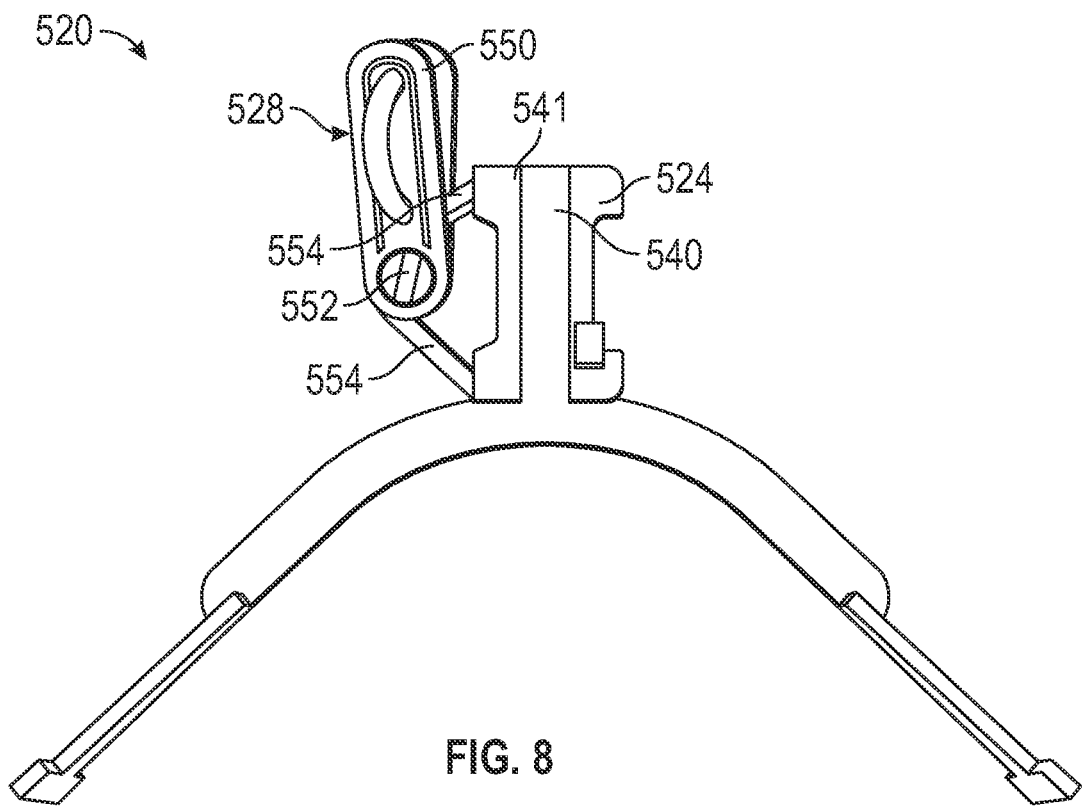
FIG. 8 illustrates the example endotracheal tube support apparatus of FIG. 7.

FIG. 8 illustrates the example endotracheal tube support apparatus 520 of FIG. 7. The support 524 includes a groove 540 provided in a first surface 541 of the support 524 for receiving a tube (not shown for ease of viewing). In some examples, the tube is an endotracheal tube, such as the endotracheal tube 526 shown in FIG. 7. The example clamp 528 includes a bar 550 for securing the tube within the groove 540. The example bar 550 pivots about a pivot joint 552 and is shown in a disengaged position. In some examples, the pivot joint 552 may include one or more fasteners to provide rotation. The example pivot joint 552 may be spaced from the support 524, such as by one or more extending arms 554 extending away from the support 524 to the pivot joint 552.

Figure 9:
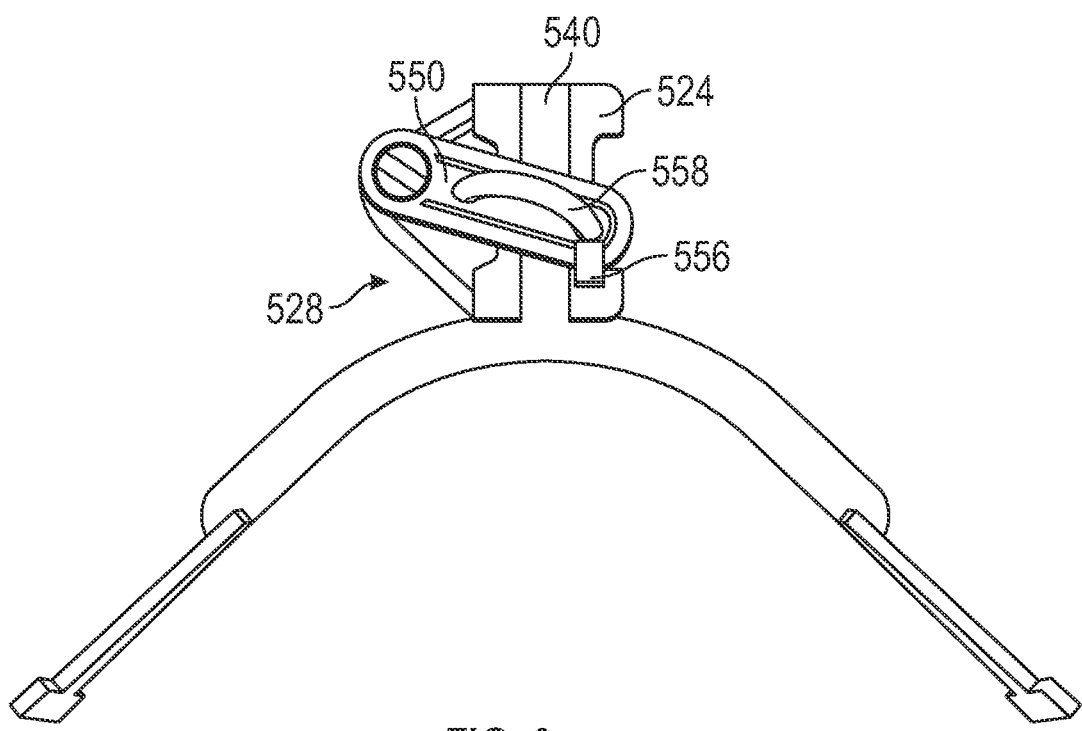
FIG. 9 illustrates the example endotracheal tube support apparatus of FIGS. 7 and 8 in an engaged position.

FIG. 9 shows the example clamp 528 in an engaged position. In the example shown, the bar 550 is pivoted to be secured in a notch provided by an extension 556 from the support 524. The bar 550, made of one or more polymeric materials, in turn secures the tube (not shown) against movement within the groove 540. In some examples, as shown, the bar 550 may include a handle 558 for moving the bar 550 between the engaged and disengaged positions.

Figure 10:
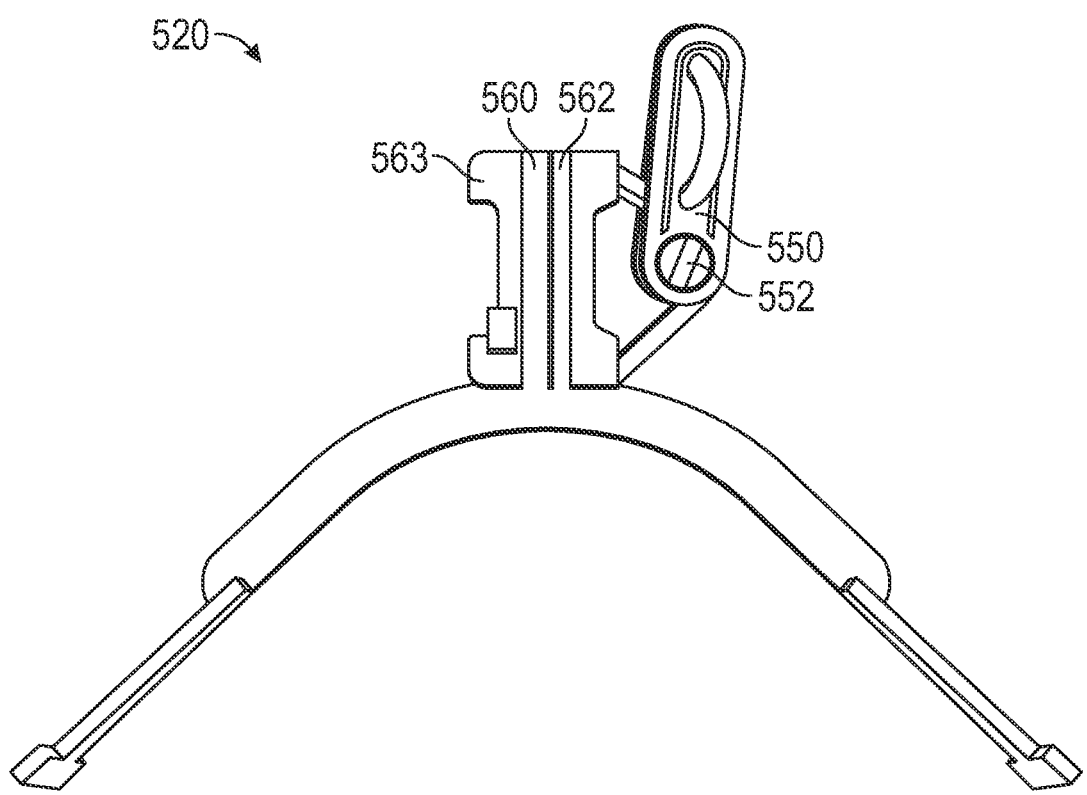
FIG. 10 illustrates the example endotracheal tube support apparatus of FIGS. 7-10 at an opposite side of that shown in FIGS. 8 and 9.

FIG. 10 illustrates the example endotracheal tube support apparatus 520 at an opposite side of that shown in FIGS. 8 and 9. The opposite side is substantially similar to the side shown in FIGS. 8 and 9, with one difference being that two grooves 560 and 562 are provided in a second surface 563 of the support 524, with the second surface 563 being opposite the support 524 from the surface 541 (see FIG. 8). In some examples, as shown, the grooves 560, 562 have different widths from one another. In some examples, the grooves 560, 562 are sized to accommodate feeding and/or gastric suction tubes of different diameters, including an orogastric tube and a nasogastric tube in some examples. A second bar 550 is provided and pivotable around the pivot joint 552 to secure one or more tubes (not shown for ease of viewing) in their respective grooves 560, 562.

Figure 11:
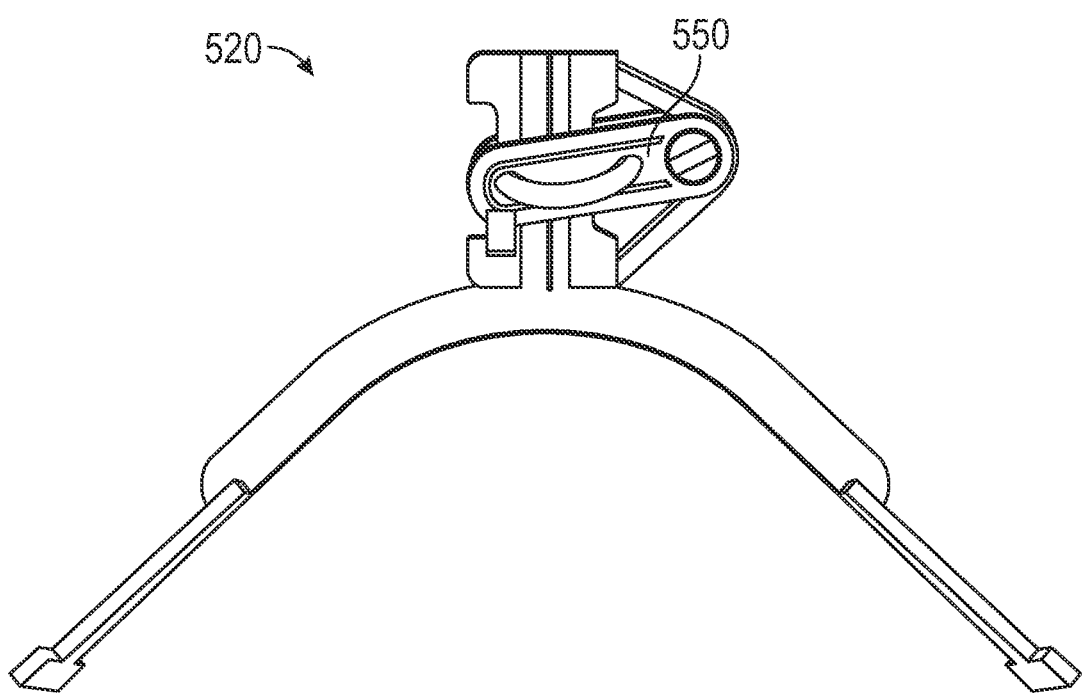
FIG. 11 illustrates the example endotracheal tube support apparatus of FIGS. 7-10 in an engaged position and at an opposite side of that shown in FIGS. 8 and 9.

FIG. 11 illustrates the example endotracheal tube support apparatus 520 at the side shown in FIG. 10 and having the second bar 550 in an engaged position to secure a tube (not shown) against movement within either groove 560, 562.

In the examples shown, tubes may be selectively secured and unsecured in their respective grooves 540, 560, 562. For example, a tube in groove 540 could be unsecured for adjustment while a tube in groove 560 remains secured. For example, a medical professional is able to adjust or remove an orogastric tube in a patient while keeping the endotracheal tube secured. As another example, a medical professional is able to adjust or remove an endotracheal tube in a patient while keeping an orogastric tube secured.

Figure 12:
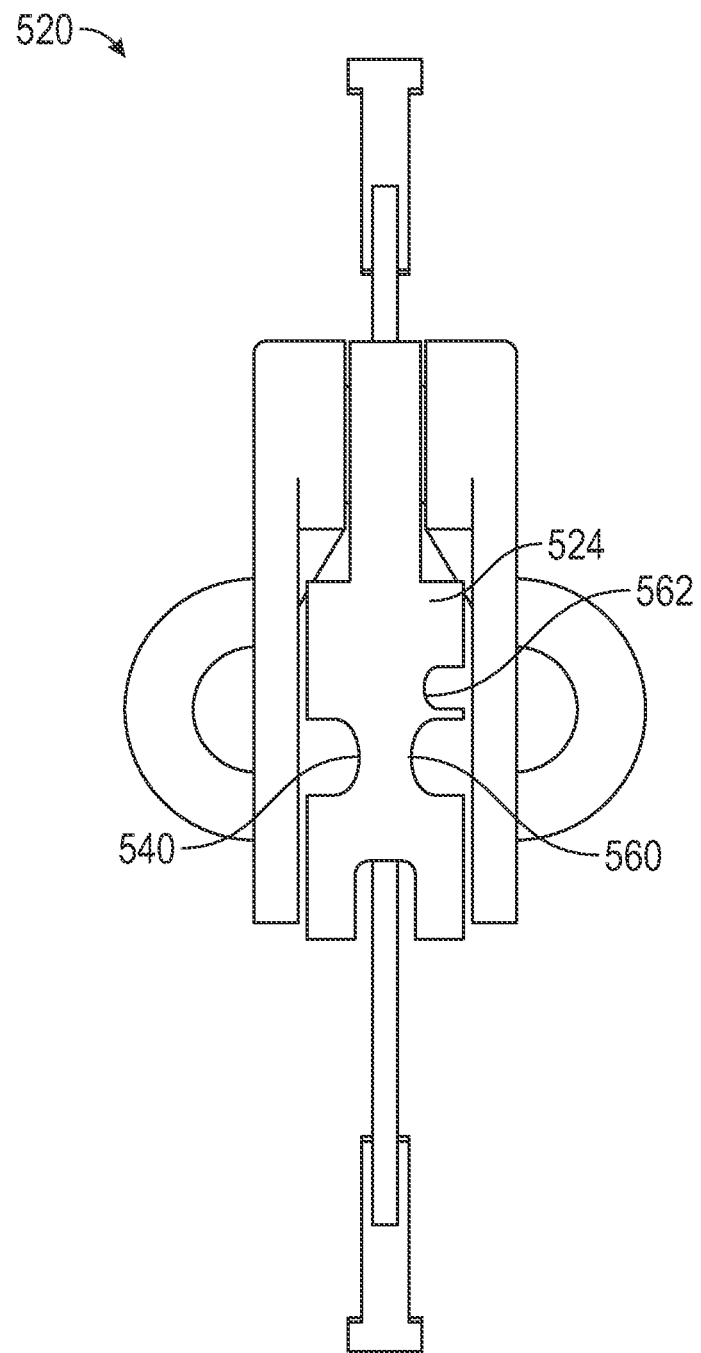
FIG. 12 illustrates a top view of the example endotracheal tube support apparatus of FIGS. 7-11.

FIG. 12 illustrates a top down view of the example endotracheal tube support apparatus 520. The groove 540 is at an opposite side of the support 524 from the grooves 560, 562.

Referring back to FIG. 7, in the example shown, an orogastric feeding tube 564 is clamped within the groove 560 (see FIG. 10), and the endotracheal tube 526 is clamped within the groove 540 (see FIG. 8). As shown, the apparatus 520 is positioned such that the surface 541 is facing upward with respect to the orientation shown in FIG. 7.

Figure 13:
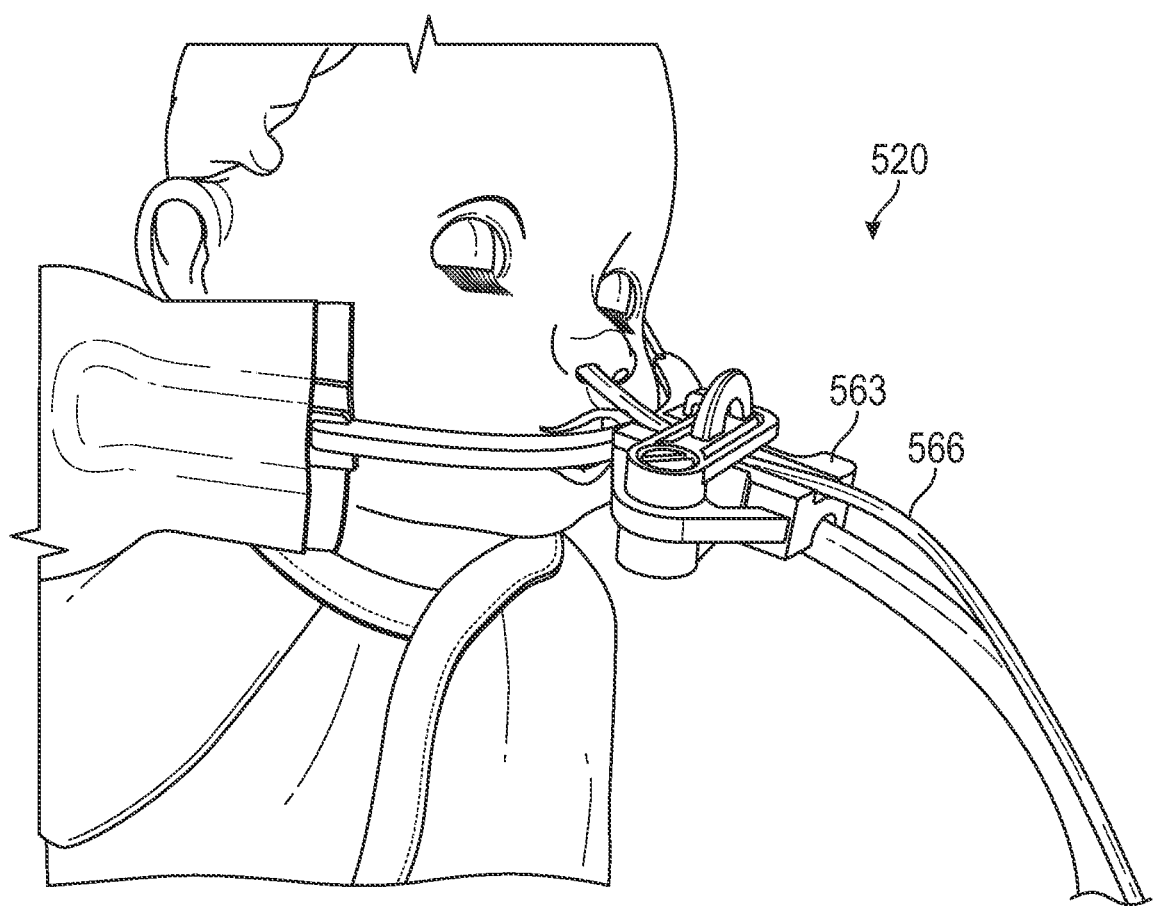
FIG. 13 illustrates the example endotracheal tube support apparatus of FIGS. 7-12 supporting a nasogastric feeding tube.

FIG. 13 illustrates the example endotracheal tube support apparatus 520 supporting a nasogastric feeding tube 566. Here, the surface 563 is facing upward with respect to the orientation shown in FIG. 13. That is, with reference back to FIG. 7, the apparatus can be positioned such that either the surface 541 or the surface 563 is positioned facing upward, depending on whether an orogastric or nasogastric feeding tube is utilized.

The example tubes are secured such that the tubes are prevented from moving longitudinally within their respective grooves 540, 560, 562, such as while a patient is on a ventilator for example.

In some examples, it is contemplated that the bars 550 may be provided by other components, including non-pivoting arrangements, such as a separate clamp in some configurations.

Figure 14:
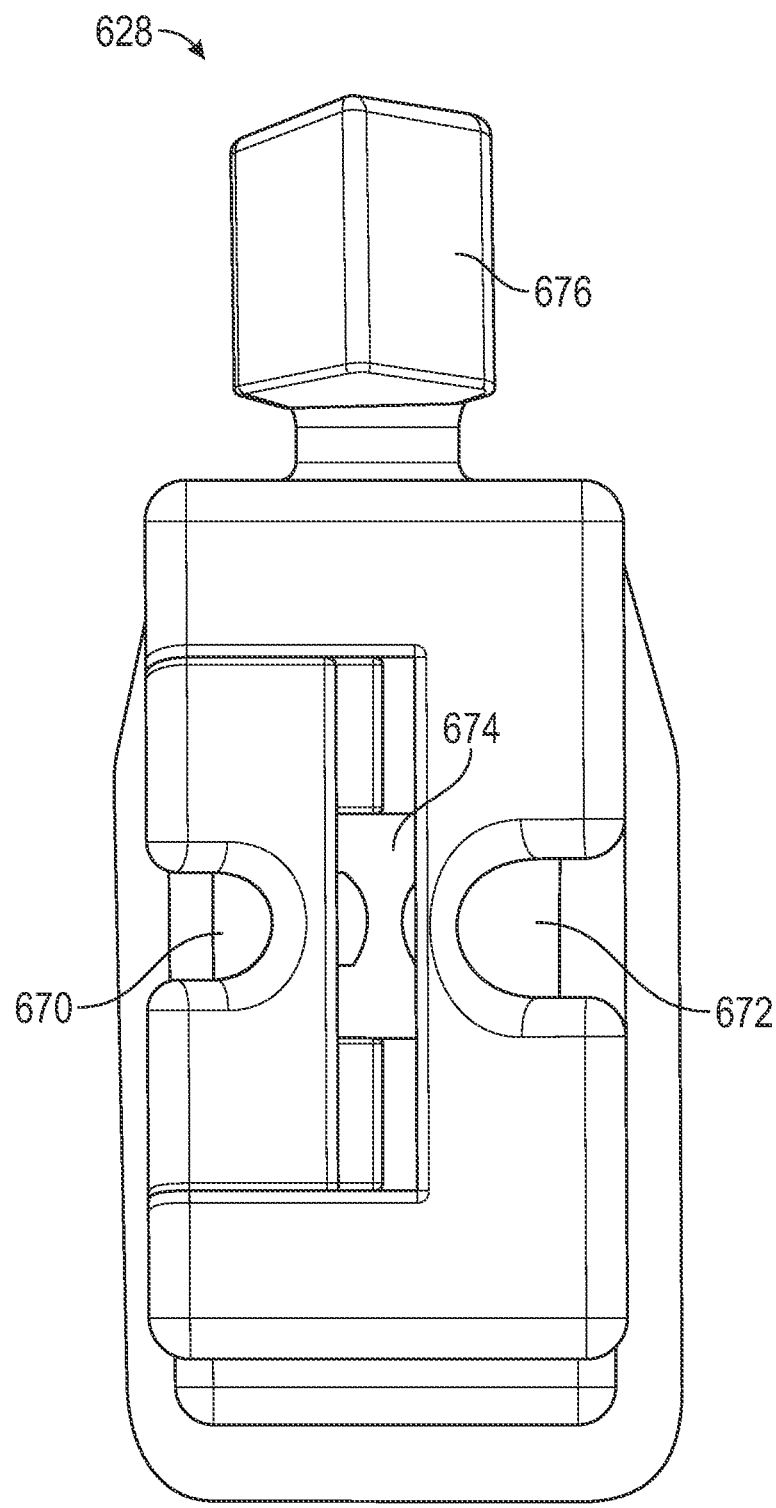
FIG. 14 illustrates a bottom view of another example clamp.
Figure 29:
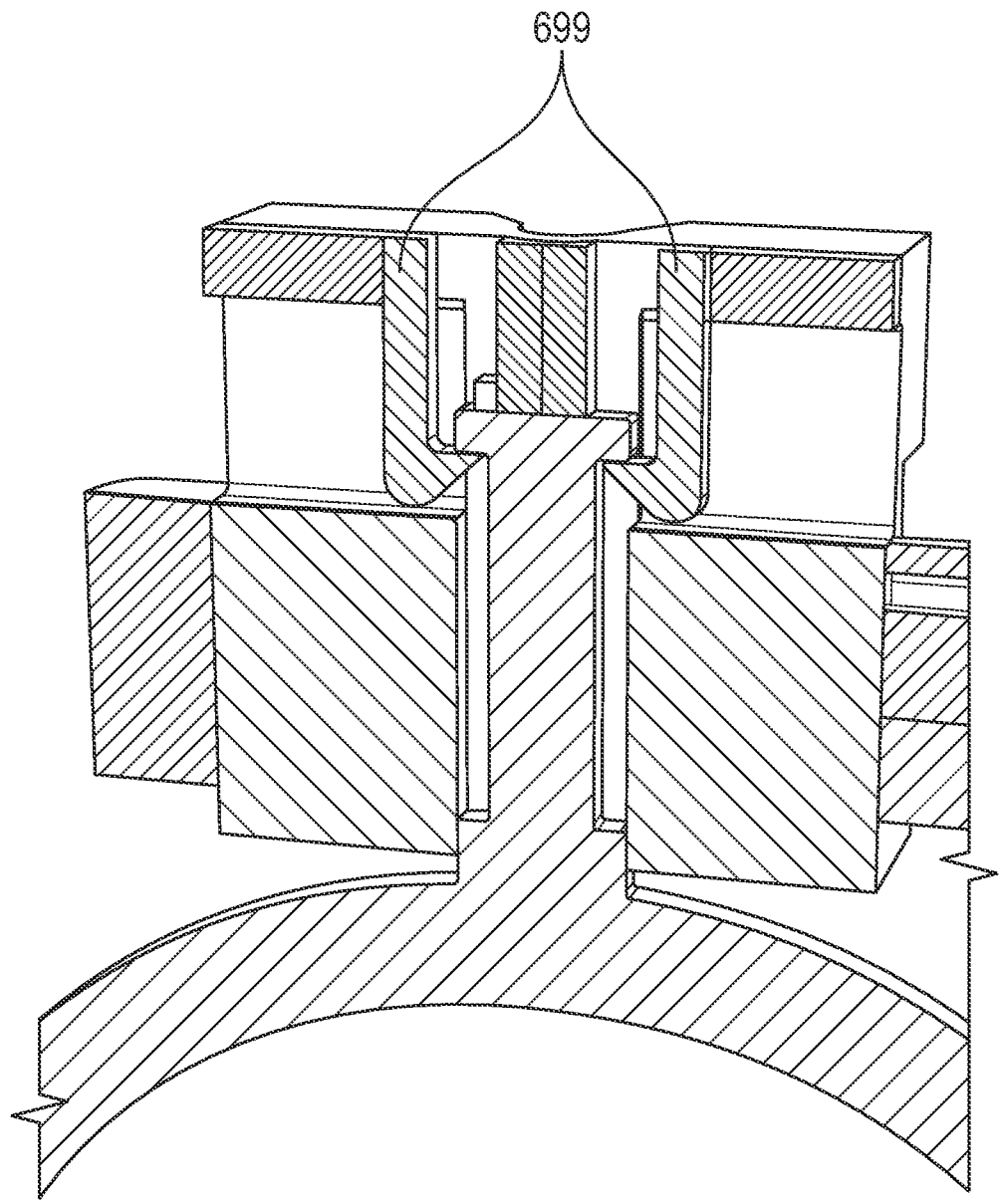
FIG. 29 illustrates internal spring hook engagement of the example clamp of FIGS. 14-28.

FIG. 14 illustrates another example clamp 628 that may be utilized with existing braces, such as NeoTech's NeoBar® brace. The example clamp 628 may include any of the materials listed above regarding the example apparatus 520. The example clamp 628 includes grooves 670, 672 for receiving endotracheal and feeding or gastric suction tubes. As shown herein, an endotracheal tube may be received in the groove 672 and a feeding tube is received in the groove 670 in some examples. A slot 674 is provided between the grooves 670, 672 for receiving the support of a brace, such as NeoTech's NeoBar® brace. Internal spring hooks 699 within the slot 674 may engage the T-shaped end of the brace as shown in FIG. 29. It is further contemplated that other examples may be utilized with other brace types. A knob 676 is provided for selectively moving the clamp 628 between multiple disengaged positions in which one or more tubes are freely slidable within the grooves 670, 672 and an engaged position in which the tubes are secured against movement within the grooves 670, 672. FIG. 8 illustrates the example clamp 628 in an engaged position.

Figure 15:
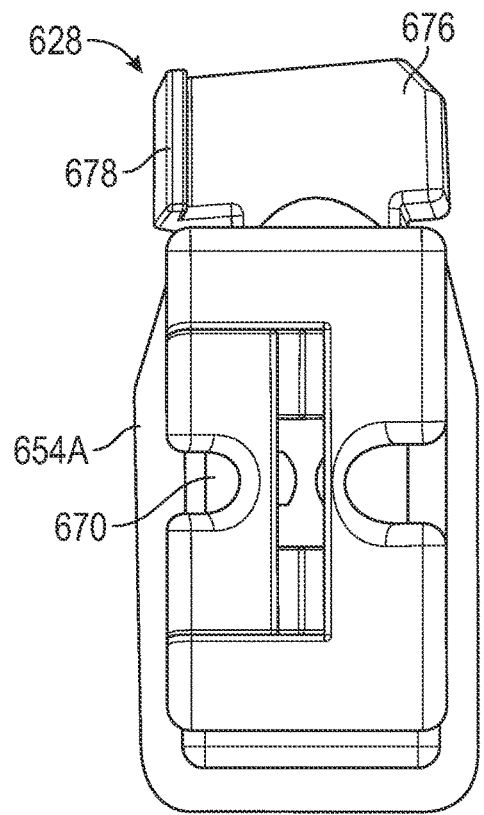
FIG. 15 illustrates the example clamp of FIG. 14 in a first disengaged position.

FIG. 15 illustrates the example clamp 628 in a first disengaged position. The knob 676 is turned toward the groove 670 to move a first bar portion 654A away from the groove 670 such that a tube received in the groove 670 is freely slidable within the groove 670. In some examples, as shown, the knob 676 has an indicator 678, such as an arrow, to aid a user in disengaging the desired tube in the desired groove. As shown, in the first disengaged position, the arrow 678 is pointing toward the groove 670.

Figure 16:
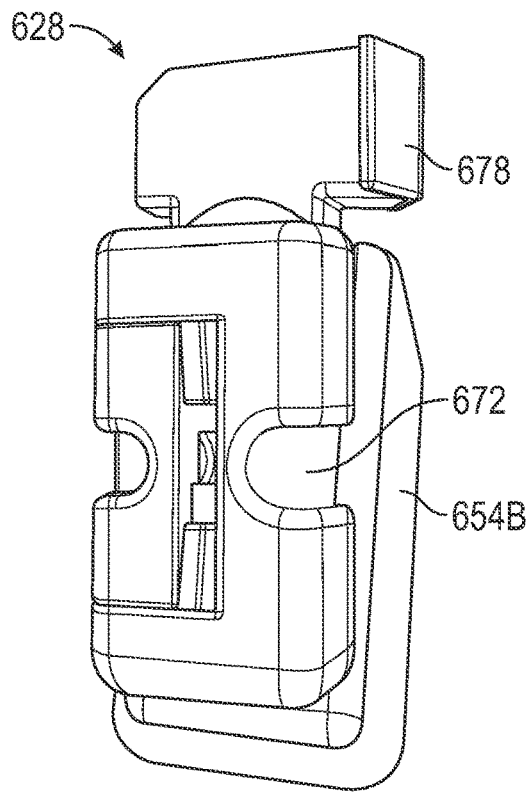
FIG. 16 illustrates the example clamp of FIGS. 14 and 15 in a second disengaged position.

FIG. 16 illustrates the example clamp 628 in a second disengaged position. The knob 676 is turned toward the groove 672 to move a second bar portion 654B away from the groove 672 such that a tube received in the groove 672 is freely slideable within the groove 672. As shown, in the second disengaged position, the arrow 678 is pointing toward the groove 672. Exemplary internal configurations for moving the bars 654A and 654B are explained further below.

Figure 17:
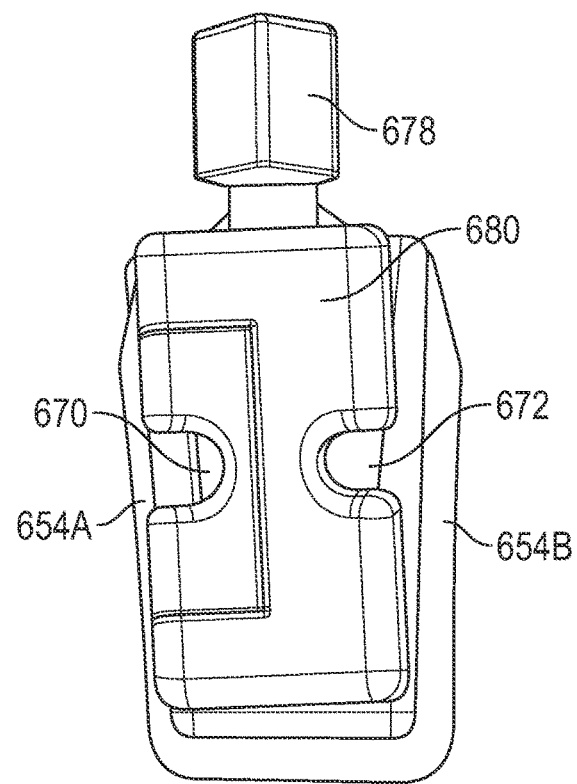
FIG. 17 illustrates the example clamp of FIGS. 14-16 in a third disengaged position.

FIG. 17 illustrates the example clamp 628 in a third disengaged position in which the arrow 678 is pointing to the upper surface 680 of the clamp 628 and tubes received in both grooves 670, 672 are freely slidable within the grooves 670, 672. The example upper surface 680 is opposite a lower surface that includes the opening for the slot 674.

Figure 18:
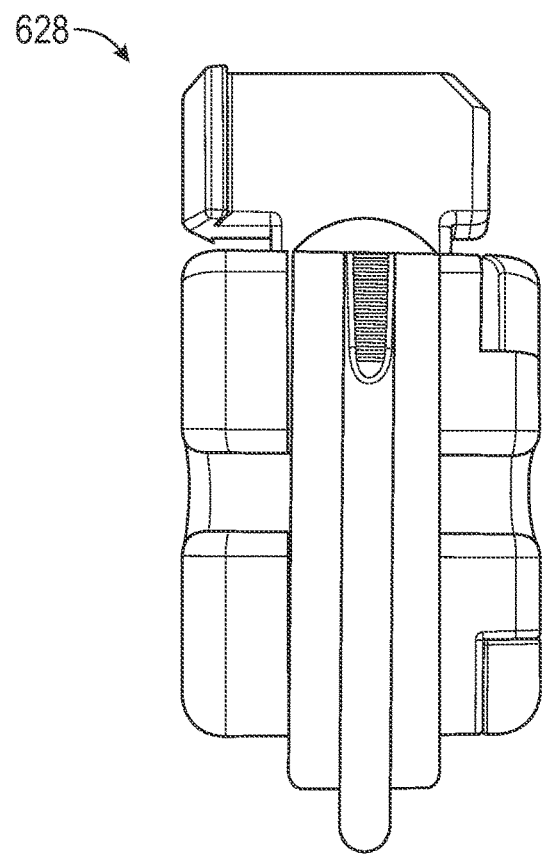
FIG. 18 illustrates a side view of the example clamp of FIGS. 14-17.
Figure 19:
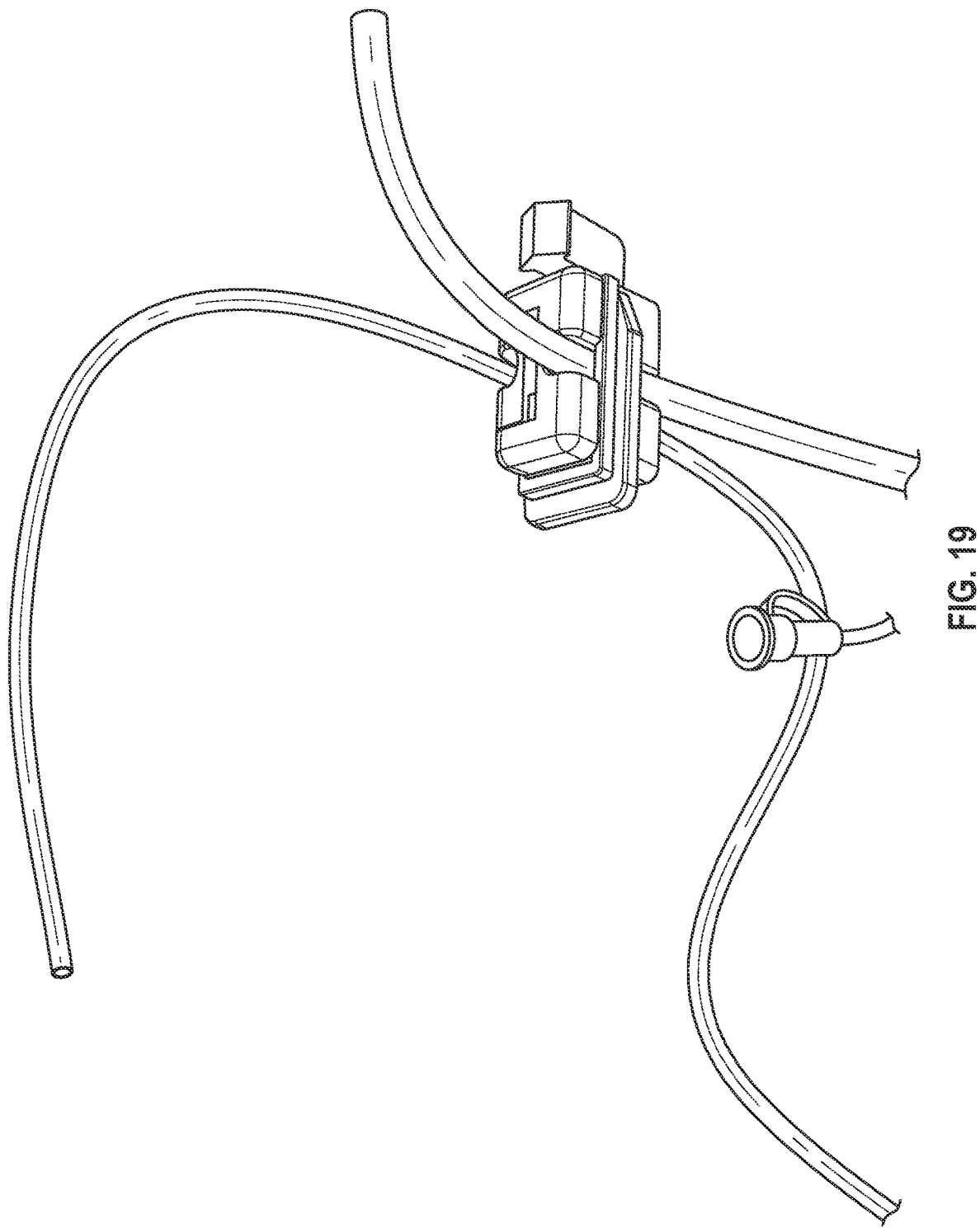
FIG. 19 illustrates the example clamp of FIGS. 14-18 receiving tubes.
Figure 20:
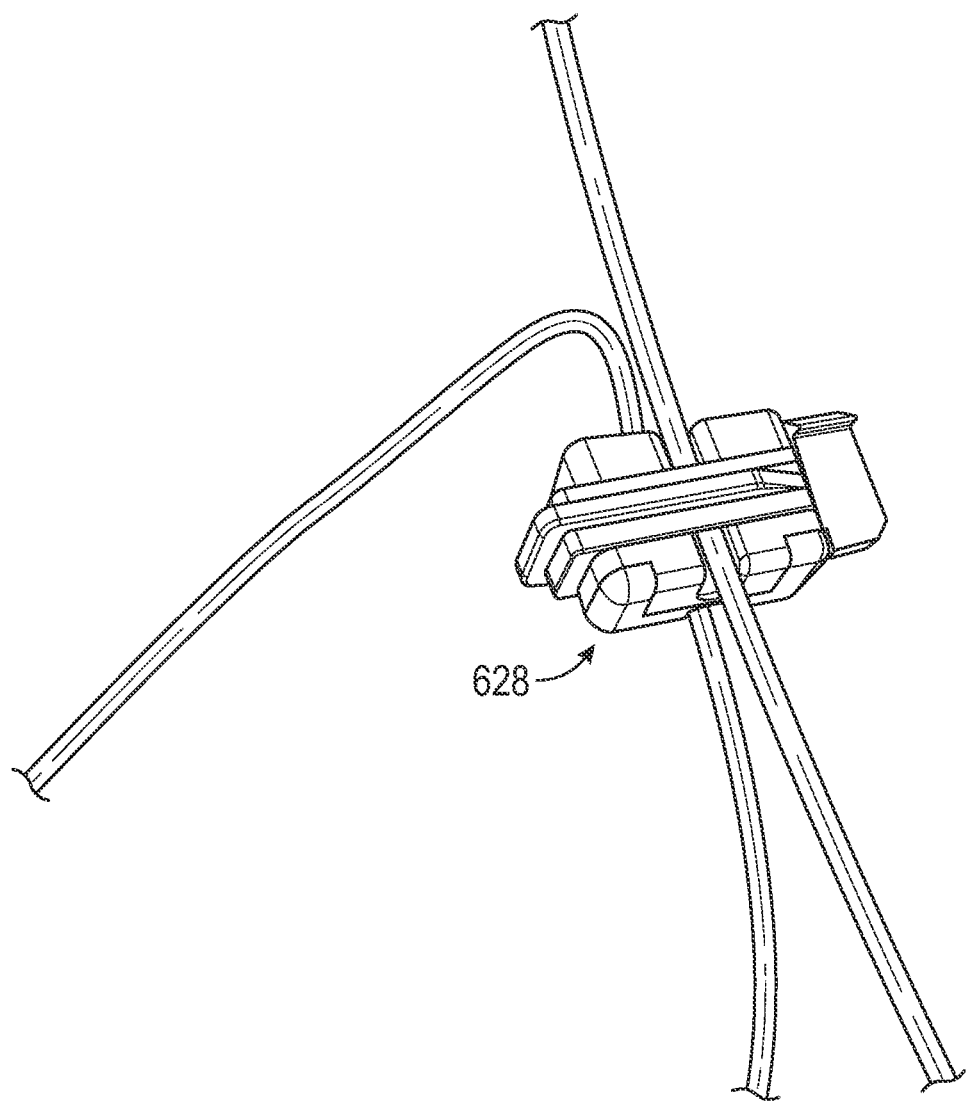
FIG. 20 illustrates the example clamp of FIGS. 14-19 receiving tubes.
Figure 21:
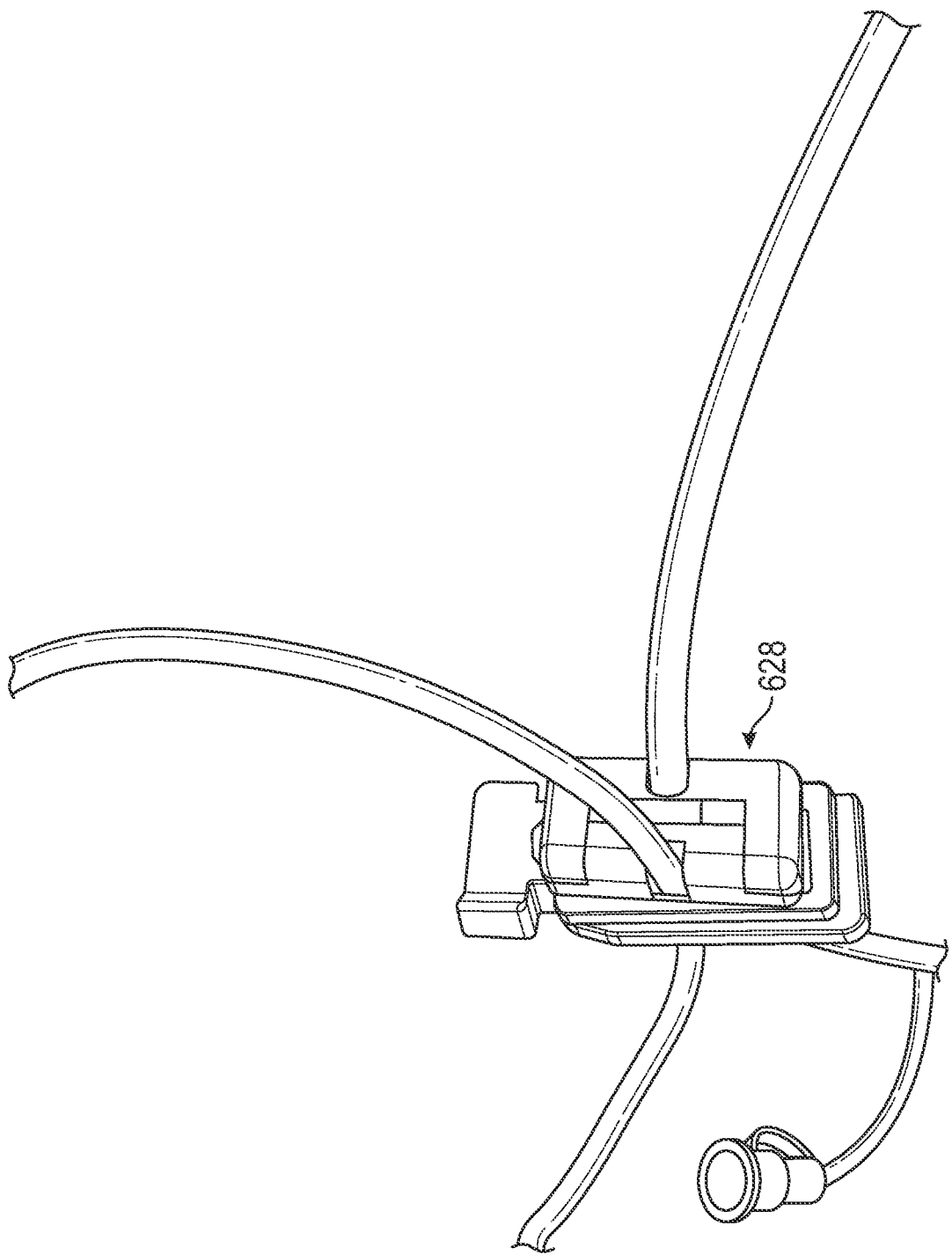
FIG. 21 illustrates the example clamp of FIGS. 14-20 receiving tubes.
Figure 22:
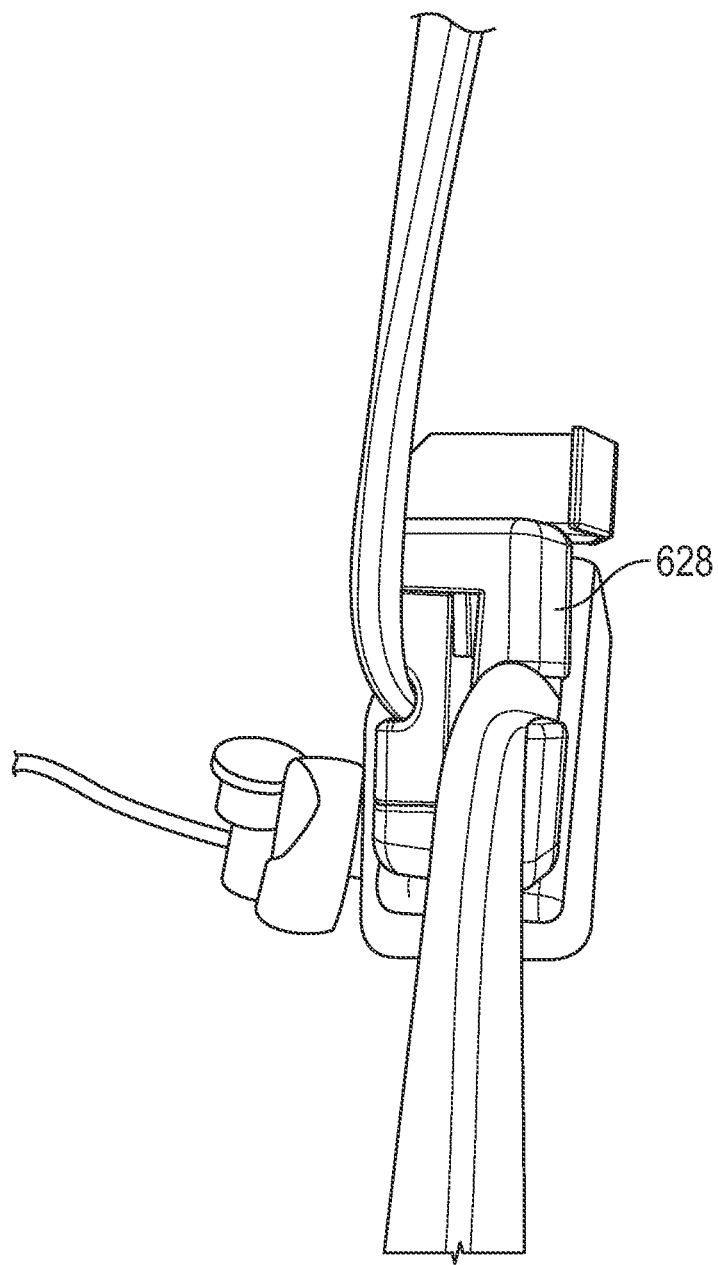
FIG. 22 illustrates the example clamp of FIGS. 14-21 receiving tubes.

FIG. 18 illustrates a side view of the example clamp 628.

FIGS. 19-22 show the example clamp 628 receiving tubes. In some examples as shown, the example clamp can secure a feeding tube, a gastric suction tube, and/or an endotracheal tube within its grooves 670, 672.

Figure 23:
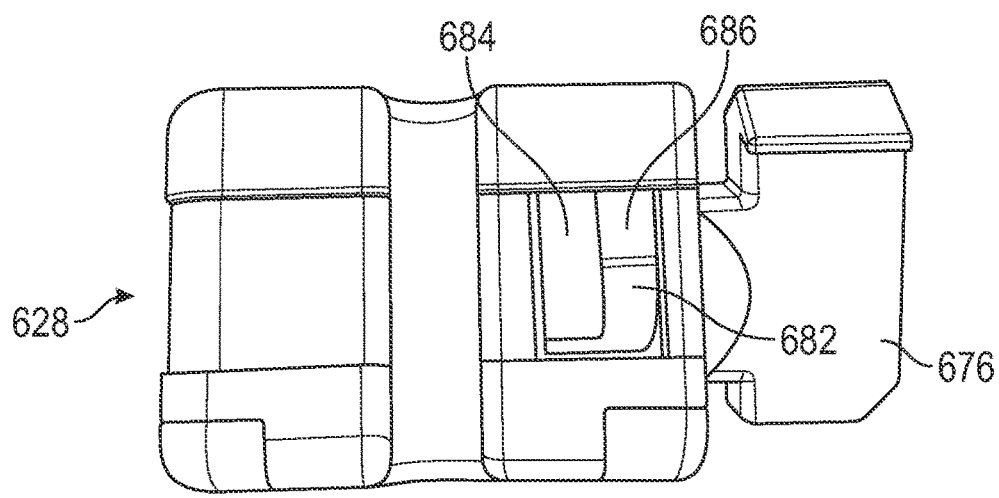
FIG. 23 illustrates the example clamp of FIGS. 14-22 with the bars removed.

FIG. 23 illustrates the example clamp 628 with the bars 654A and 654B removed. The knob 676 rotates with a shaft 682 including a first cam surface 684 and a second cam surface 686 axially adjacent and circumferentially offset from the first cam surface 684 relative to the rotational axis of the shaft 682. Other configurations for moving the bars 654A and 654B, including other cam surface configurations, may be utilized in some examples.

Figure 24:
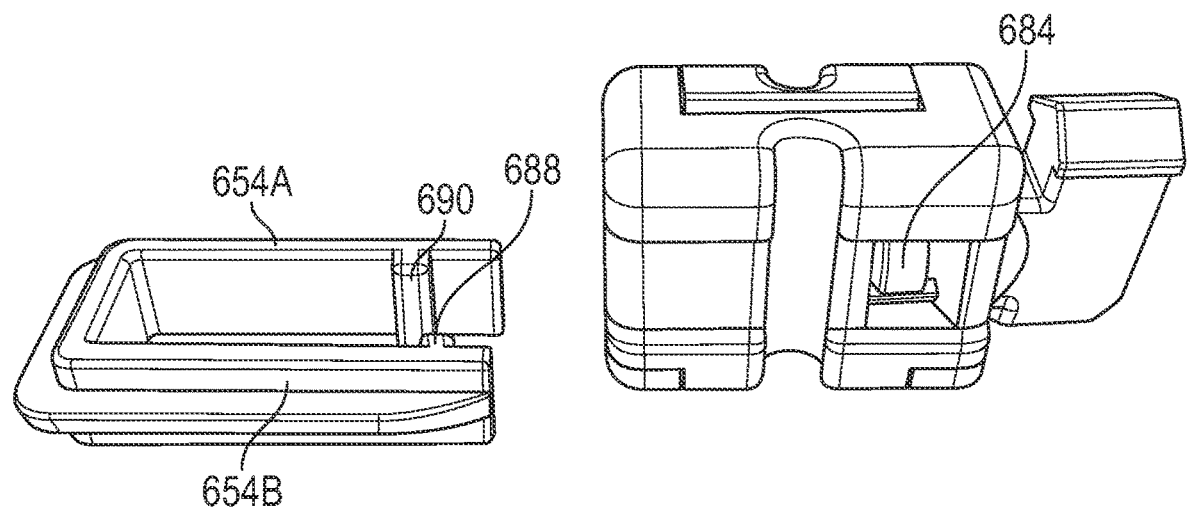
FIG. 24 illustrates the example clamp of FIGS. 14-23 in the engaged position and with the bars removed.

FIG. 24 illustrates the example clamp 628 with the bars 654A and 654B removed from the main body and the clamp 628 in the engaged position and with the bars 654A and 654B located next to the main body 629 for reference. In some examples, the bars 654A and 654B may be parts of a separate U-shaped component as shown that may be securable to the main body by a snap fit or other securing arrangement. The bars 654A and 654B extend generally parallel to one another from ends of a cross member to free ends to form the U-shaped component. The bars 654A and 654B and the cross member are integrally molded of a suitable plastic to form the U-shaped component.

The inner surface of the bar 654B includes a protrusion 688 and the inner surface of the bar 654A includes a protrusion 690. In the engaged position, the cam surface 684 does not engage the protrusion 690 and the cam surface 686 does not engage the protrusion 688. The bars 654A, 654B are biased toward an engaged position, such that when the respective cam surfaces 684, 686 do not abut the protrusions 688, 690, the bars 654A, 654B secure tubes within their respective grooves 670, 672.

Figure 25:
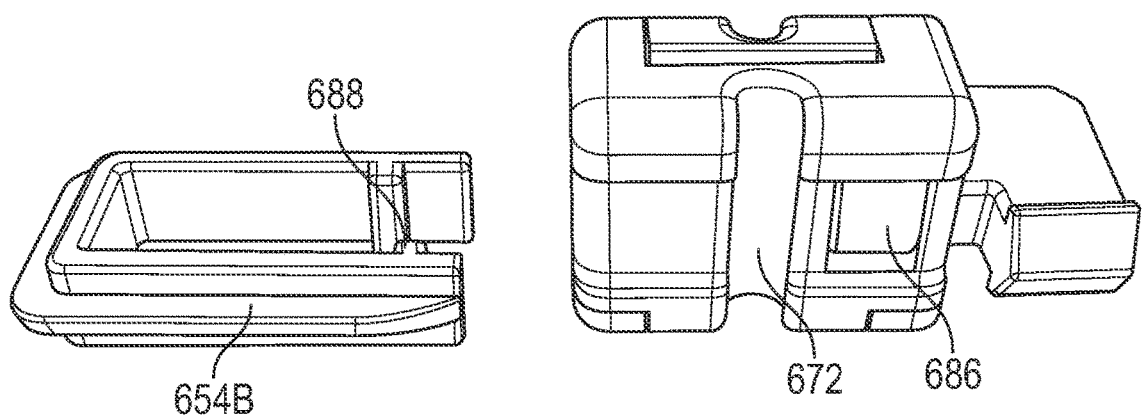
FIG. 25 illustrates the example clamp of FIGS. 14-24 in the second disengaged position and with the bars removed.

FIG. 25 illustrates the example clamp 628 in the second disengaged position. The cam surface 686 abuts the protrusion 688 to push the bar 654B away from the groove 672 so that a tube may be freely slidable within the groove 672. The cam surface 684 does not abut the protrusion 690.

Figure 26:
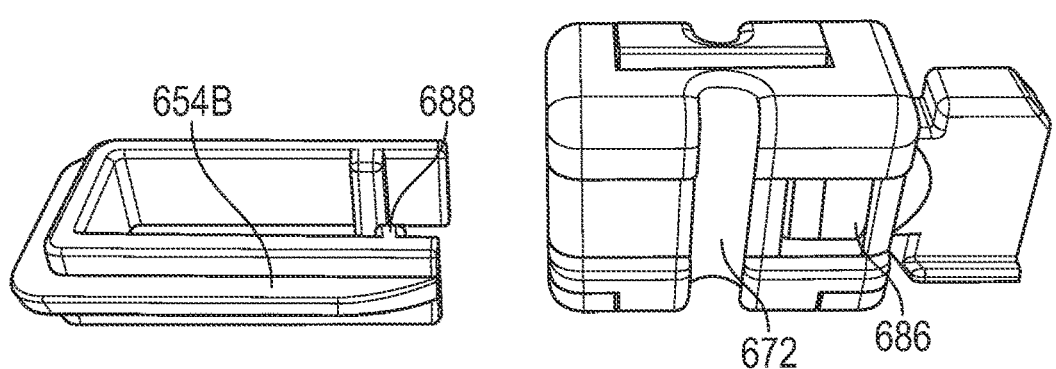
FIG. 26 illustrates the example clamp of FIGS. 14-25 in the third disengaged position and with the bars removed.
Figure 27:
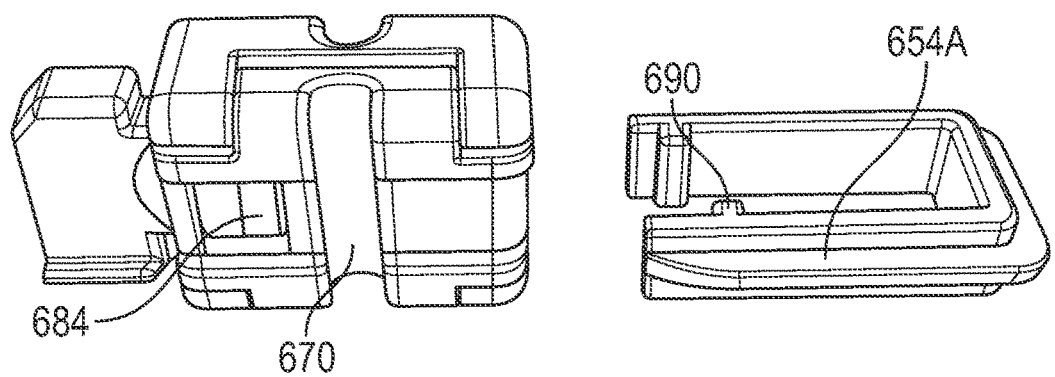
FIG. 27 illustrates the example clamp of FIGS. 14-26 in the third disengaged position and with the bars removed.

FIGS. 26 and 27 illustrate the example clamp 628 in the third disengaged position. The cam surface 686 abuts the protrusion 688 to push the bar 654B away from the groove 672 so that a tube may be freely slidable within the groove 672. The cam surface 684 abuts the protrusion 690 to push the bar 654A away from the groove 670 so that a tube may be freely slidable within the groove 670. In the disengaged positions, the cam surfaces 684, 686 selectively resiliently deform the outer ends of the bars 654, 654B outward away from the respective grooves 670, 672.

Figure 28:
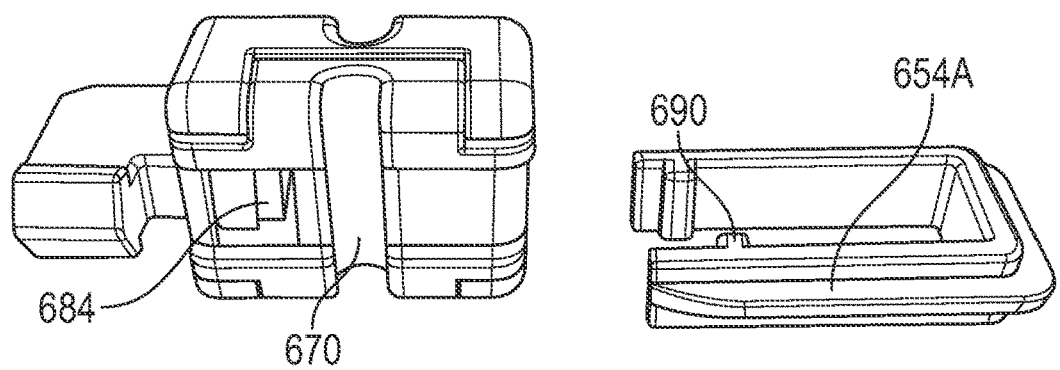
FIG. 28 illustrates the example clamp of FIGS. 14-27 in the first disengaged position and with the bars removed.

FIG. 28 illustrates the example clamp 628 in the first disengaged position. The cam surface 684 abuts the protrusion 690 to push the bar 654A away from the groove 670 so that a tube may be freely slidable within the groove 670. The cam surface 686 does not abut the protrusion 688.

As shown, a portion of the shaft 682 is free of cam surfaces so as to selectively not abut the protrusions 688, 690 in some positions.

Figure 30:
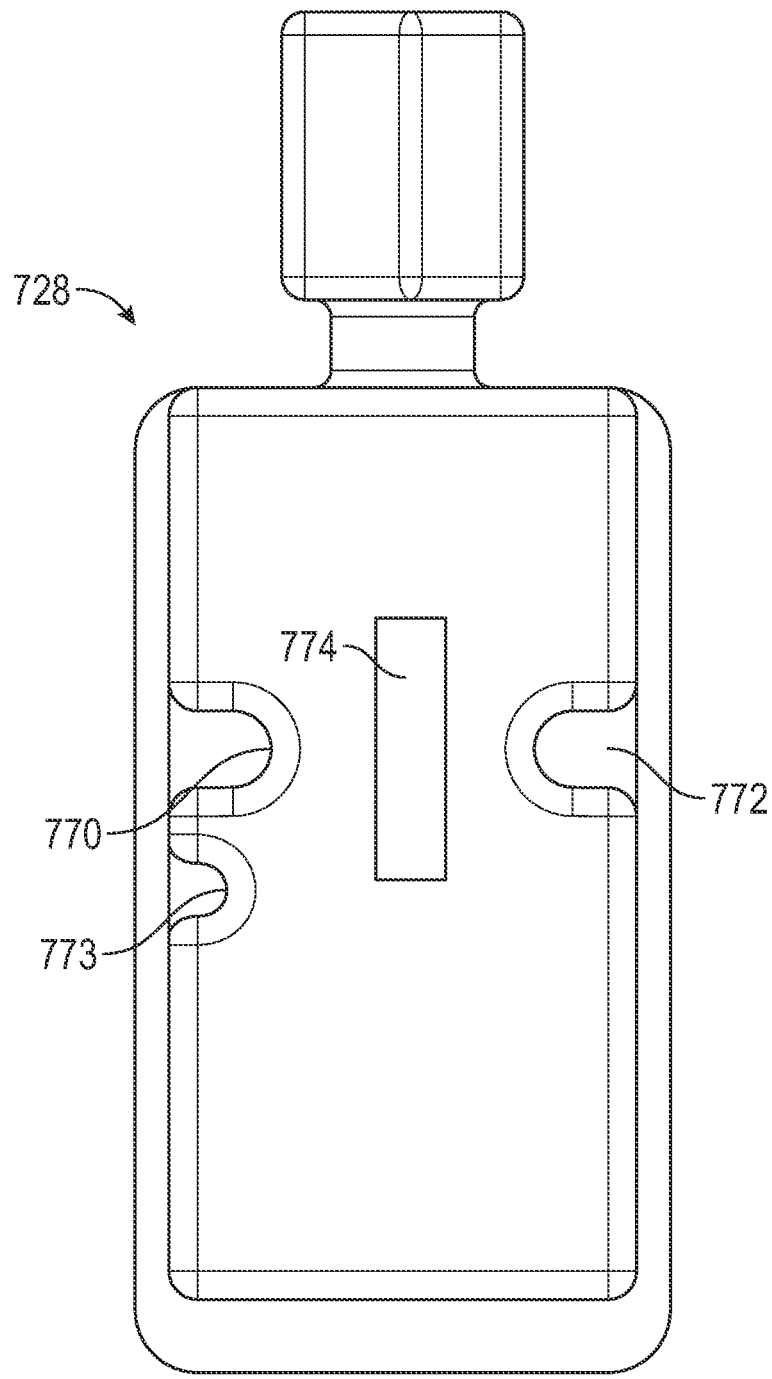
FIG. 30 illustrates another example clamp.

FIG. 30 illustrates an example clamp 728 substantially similar to the clamp 628, except that three grooves 770, 772, 773, are provided. In some examples, the grooves 770, 773 are sized differently from one another to accommodate feeding and/or gastric suction tubes of different diameters, such as an orogastric tube and a nasogastric tube in some examples. The groove 772 may be sized to accommodate an endotracheal tube in some examples. While three grooves 770, 772, 773 are shown in the illustrative example, more or fewer may be used in some examples.

Figure 31:
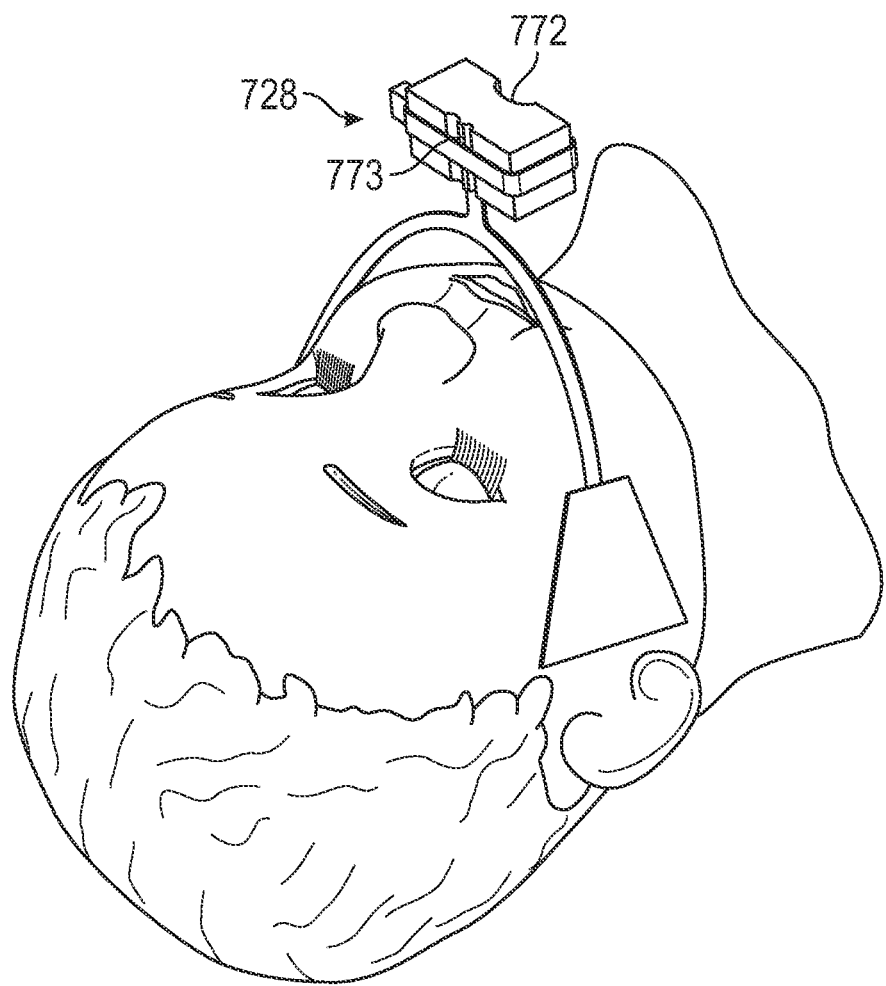
FIG. 31 illustrates the example of FIG. 30 received on a brace on a patient.
Figure 32:
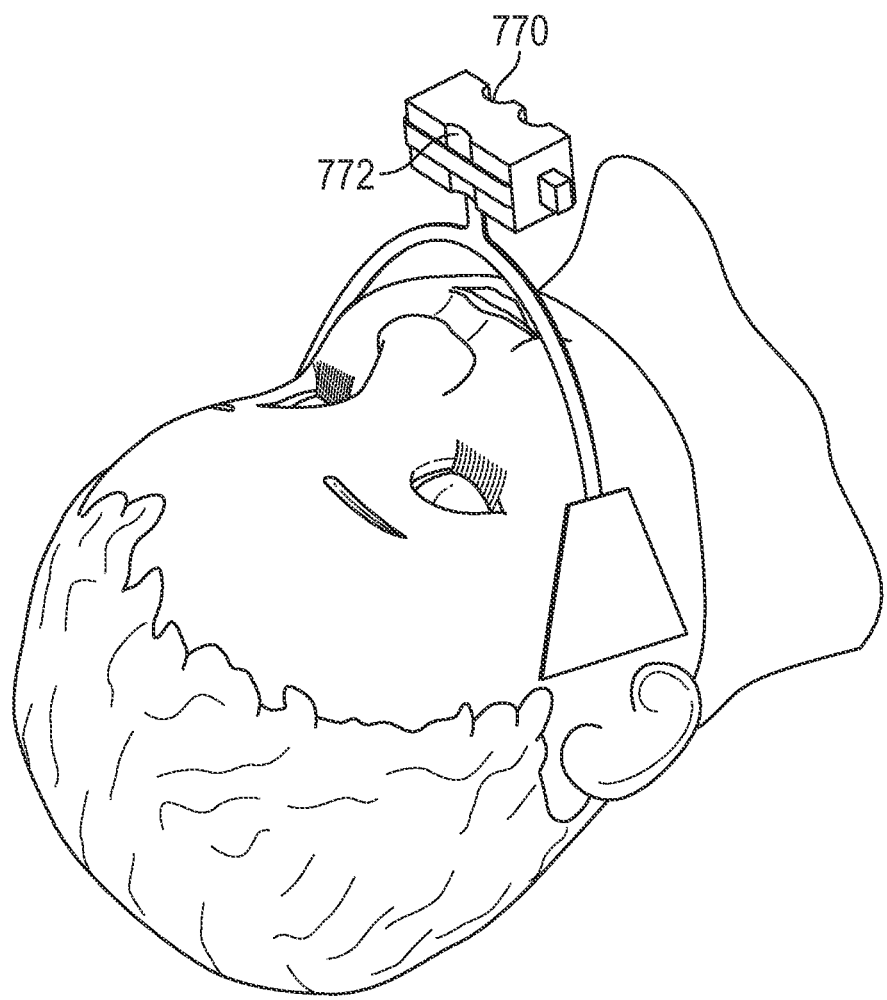
FIG. 32 illustrates the example of FIGS. 30 and 31 received on a brace on a patient and in a different orientation than that shown in FIG. 31.

In the example shown, the grooves 770 and 773 are opposite the slot 774 from the groove 772. In this example, by having the grooves 770 and 773 that are opposite the slot 774 from the groove 772, the orientation of the clamp 728 can be changed depending on whether an orogastric tube or a nasogastric tube is used. For example, as shown in FIG. 31, if a nasogastric tube (removed for ease of viewing) is used in the groove 773, the clamp 728 can be oriented so that the groove 773 is nearer the patient's nose. As shown in FIG. 32, if the groove 770 is instead utilized for an orogastric tube (removed for ease of viewing), then the orientation of the clamp 728 can be rotated about 180° such that the groove 770 is nearer the patient's mouth.

Figure 33:
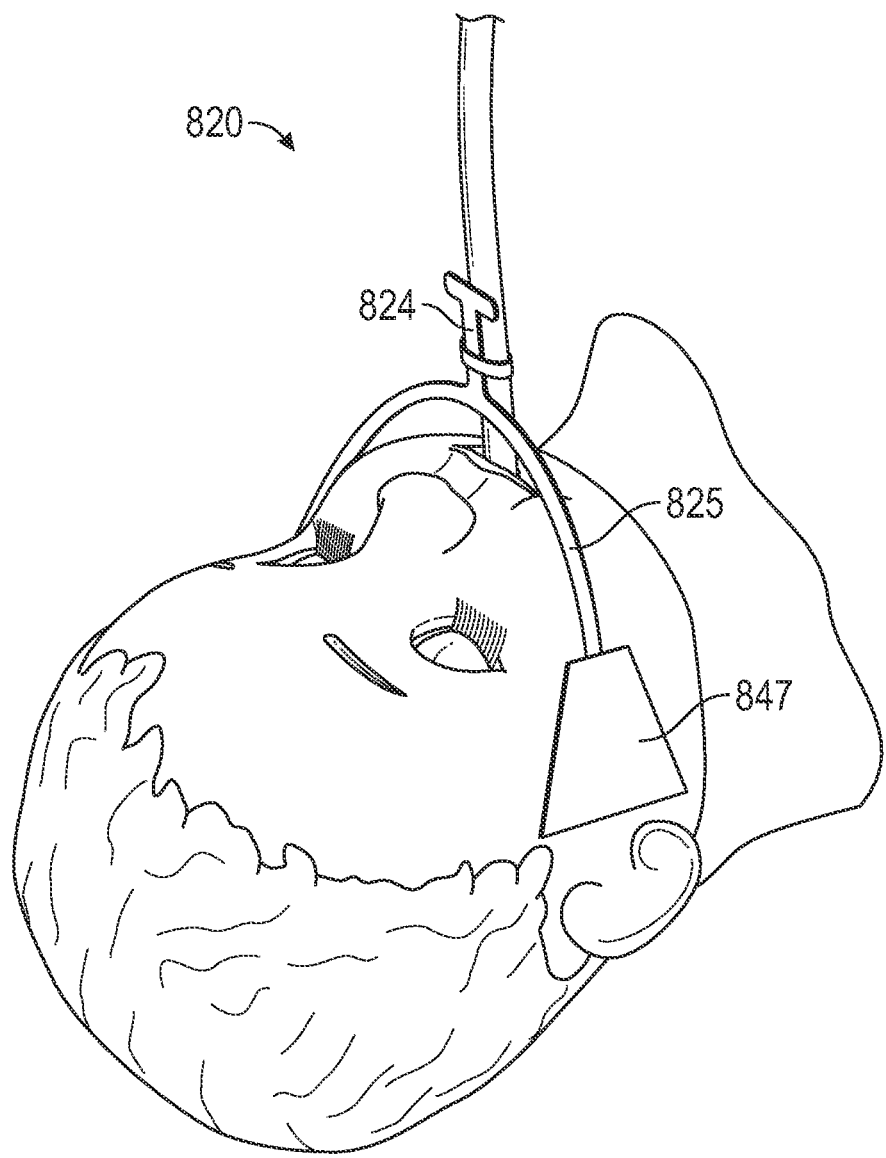
FIG. 33 illustrates another example endotracheal tube support apparatus.

FIG. 33 illustrates an example endotracheal tube support apparatus 820, including a support 824 that extends from a curved portion 825 that is contoured to complement the patient's face and secured to the patient's face at its ends by adhesive pads 847. One pad 847 is shown in the view shown in the drawing, but another similarly shaped and oriented pad may be used on the other side of the patient's face. The pads 847 may include a hydrocolloid base with a waterproof foam top layer, and are tapered in shape such that the width decreases as the pad 847 extends generally in a direction from the patient's ear toward the patient's mouth. The pads 847 may be anti-microbial. Applicant has identified problems with prior art attachment methods in which rectangular or square cloth pads are utilized and the corners of such pads nearest the patient's mouth lose adhesion, eventually leading to loss of adhesion in the entire pad and the need for replacement pads. The material and shape of Applicant's proposed pads overcome such deficiencies.

Figure 34:
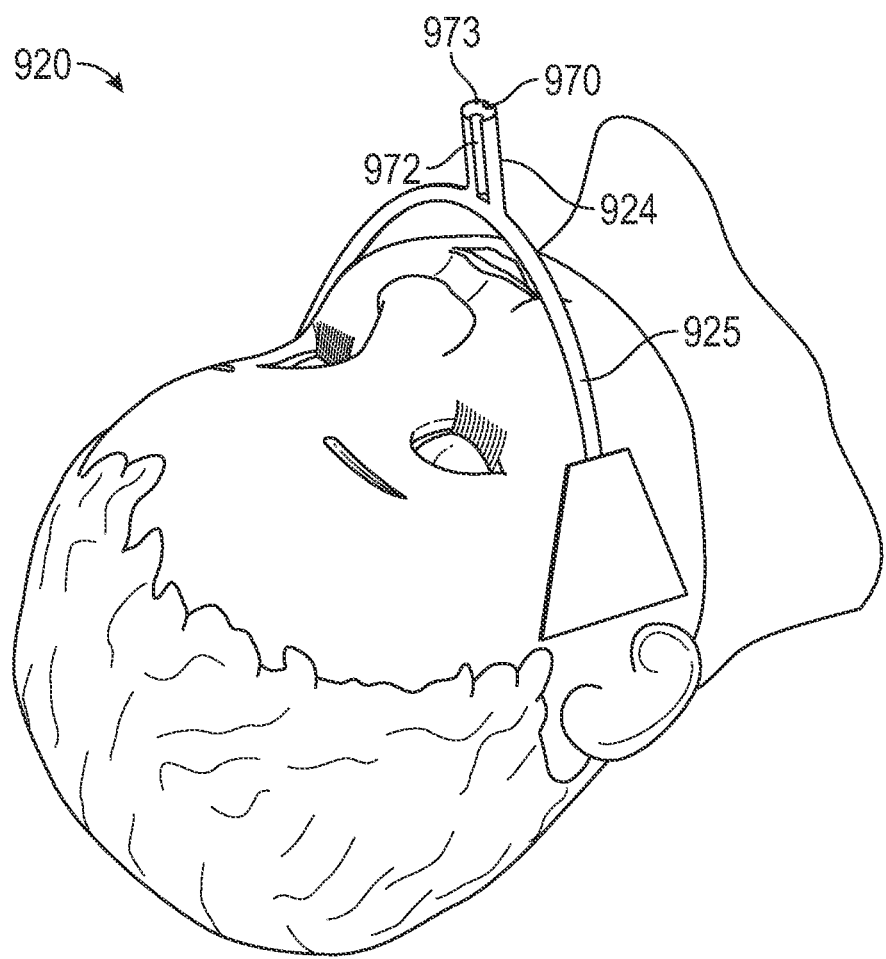
FIG. 34 illustrates another example endotracheal tube support apparatus.

FIG. 34 illustrates another example endotracheal support apparatus 920 including a support 924 providing grooves 970, 972, 973, for receiving tubes (removed for illustration purposes), including feeding and/or gastric suction tubes of different diameters, such as an orogastric tube and a nasogastric tube in some examples, as well as an endotracheal tube. In some examples, the endotracheal tube support apparatus 920, including the example clamp 928 (see FIG. 35), is made of one or more polymeric materials. In some examples, the endotracheal tube support apparatus 920, including the example clamp 928 (see FIG. 35), is made of plastic. In some examples, the endotracheal tube support apparatus 920, including the example clamp 928 (see FIG. 35), is made of medical grade polypropylene.

Figure 35:
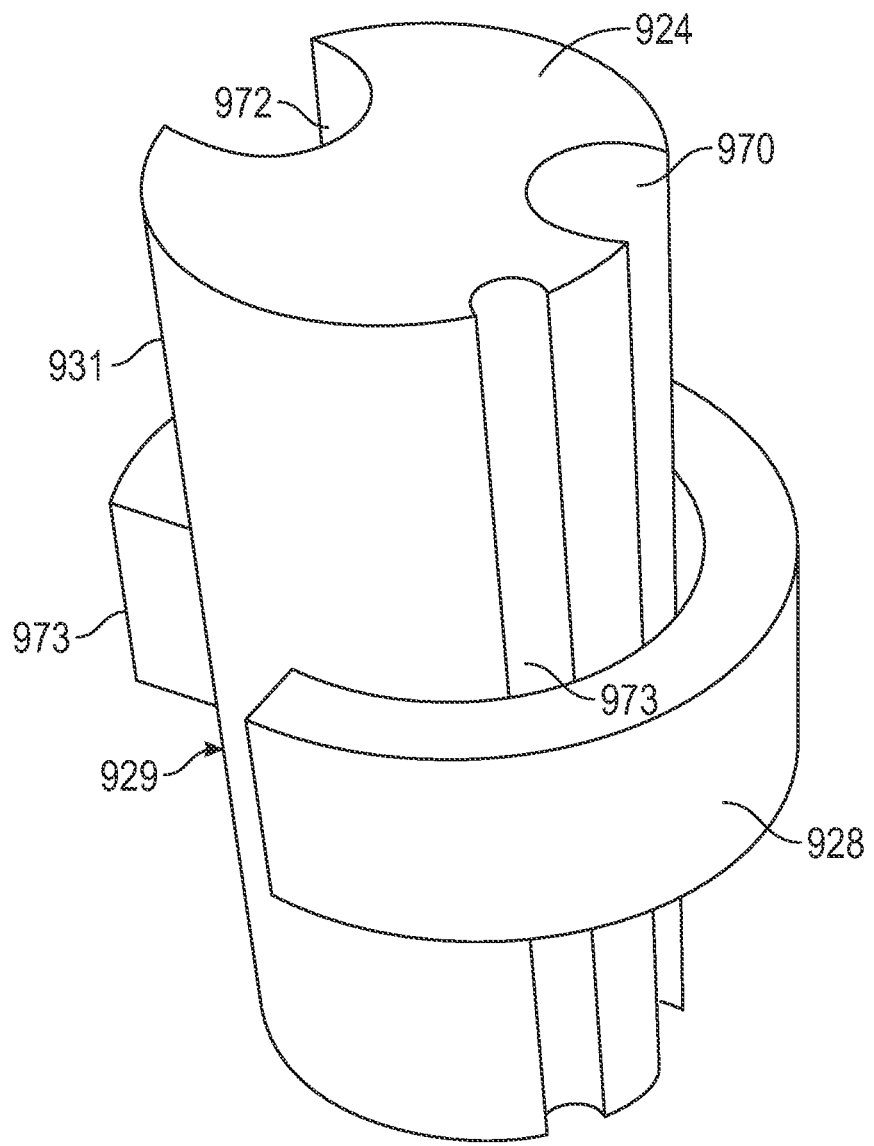
FIG. 35 illustrates the support and clamp of the example endotracheal tube support apparatus of FIG. 34.
Figure 36:
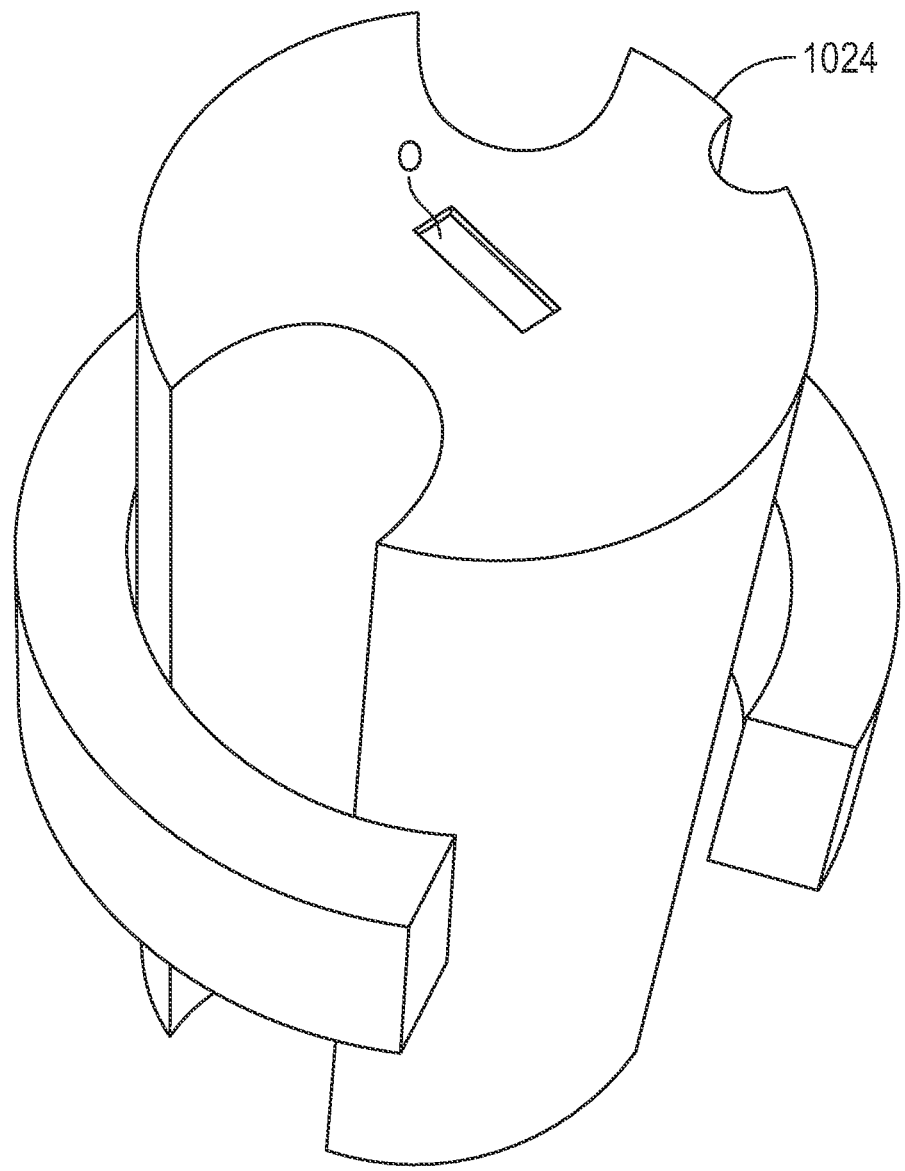
FIG. 36 illustrates the support and clamp of the example endotracheal tube support apparatus of FIGS. 34 and 35.

FIG. 35 illustrates a portion of the example endotracheal support apparatus 920 of FIG. 25 including the support 924 and a clamp 928. In some examples, the support 924 may replace a support in an existing endotracheal support apparatus, such as the support 824 in the embodiment in FIG. 33 or the equivalent support of the NeoTech® NeoBar®. In some examples, as shown in the embodiment in FIG. 36, a support 1024 may be placed over such an existing support, such as by providing an opening O at the radial center of the support 1024 for receiving the existing support.

Referring back to FIG. 35, the clamp 928 is generally C-shaped, including an open circumferential portion 929. The open circumferential portion 929 is sized such that it is received over a radially outer surface 931 of the support 924 when tubes are to be secured in the grooves, such as by moving the clamp 928 in a direction generally perpendicular to the long axis of the support 924. When one tube is to be adjusted, replaced, etc., the clamp 928 may be rotated in a clockwise or counterclockwise direction so that the open portion 929 is circumferentially aligned with the groove in which that tube is received. Therefore, one tube can be adjusted, replaced, etc., while one or more other tubes remain secured in their respective grooves. In the example, the open portion 929 has an arc length greater than or equal to the arc length of the largest groove. The open portion 929 may also have an arc length that is less than or equal to the arc length of at least one of the radially outer surfaces of the support 924, such that the clamp 928 can be moved to a position in which all grooves are covered, such as that shown in FIG. 37.

Figure 37:
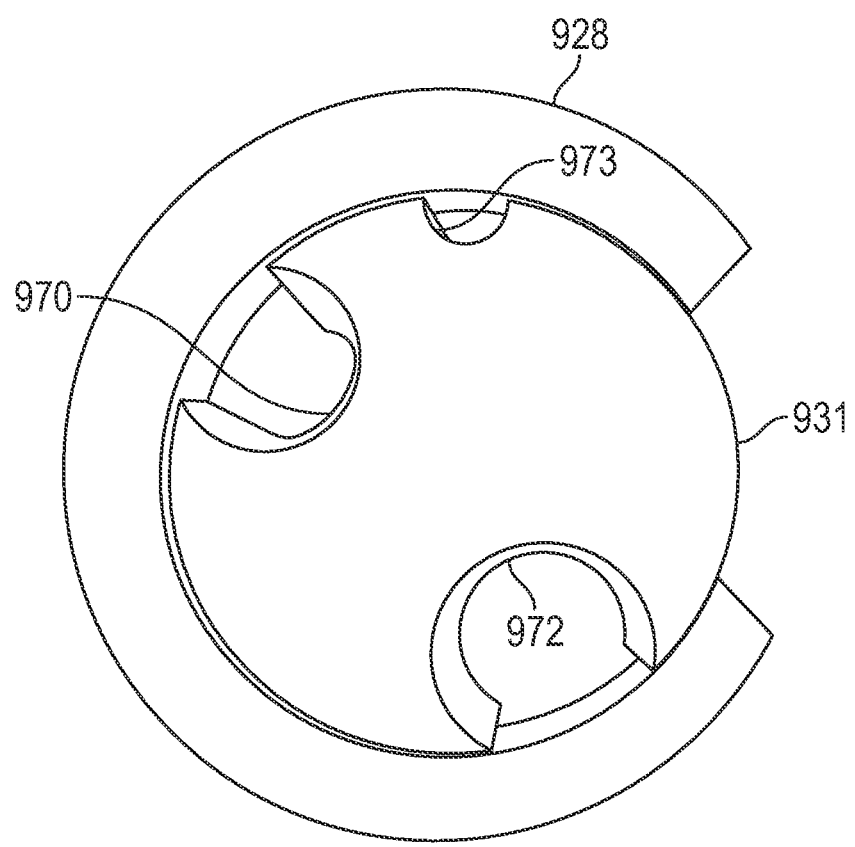
FIG. 37 illustrates a top view of the support and clamp of the example endotracheal tube support apparatus of FIGS. 34-36.

FIG. 37 illustrates an engaged position of the example clamp 928 and support 924 in which tubes can be secured in all three grooves 970, 972, 973.

Figure 38:
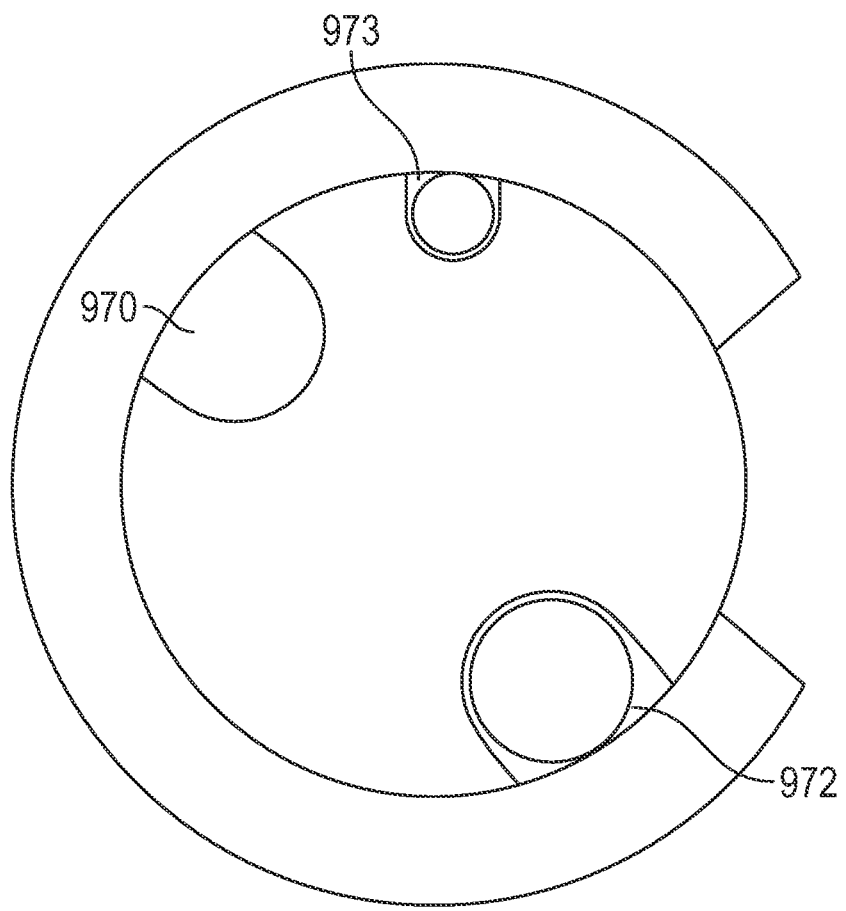
FIG. 38 illustrates a top view of the support and clamp of the example endotracheal tube support apparatus of FIGS. 34-37 with tubes secured in two of the grooves.

FIG. 38 illustrates the engaged position of the example clamp 928 and support 924 in which tubes are secured in grooves 970 and 972. As shown, the tubes can be compressed slightly and/or the clamp 928 can be expanded slightly in order to hold the tubes in place longitudinally to control the depth of the tube in the patient.

Figure 39:
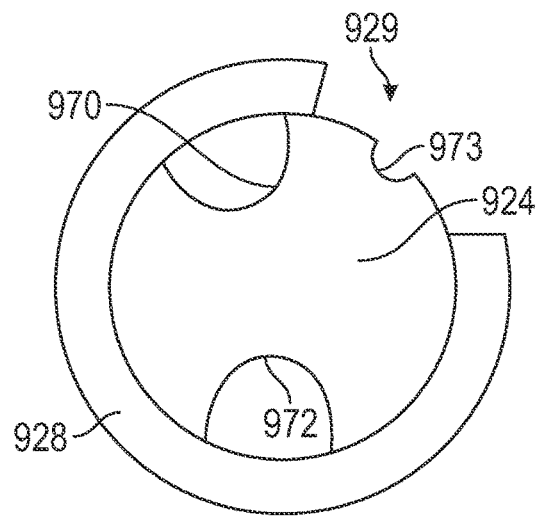
FIG. 39 illustrates a first disengaged position of the clamp and support of the example endotracheal tube support apparatus of FIGS. 34-38.

FIG. 39 illustrates a first disengaged position of the example clamp 928 and support 924, in which the open portion 929 is circumferentially aligned with the groove 973 and therefore the clamp 928 is disengaged with respect to the groove 973 such that a tube in the groove 973 can be removed, adjusted, etc., while tubes (not shown) in one or both of the grooves 972 and 970 remain secured.

Figure 40:
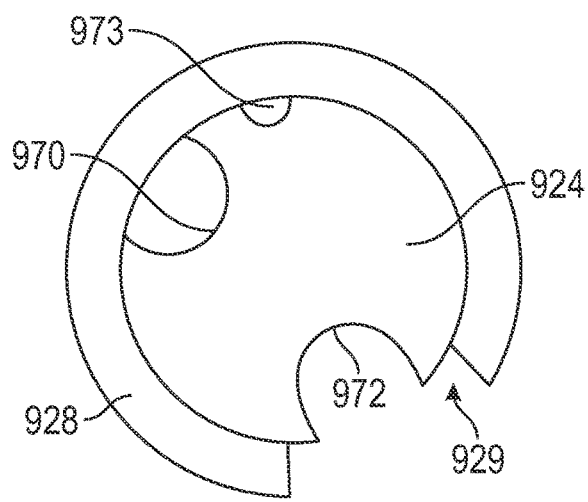
FIG. 40 illustrates a second disengaged position of the clamp and support of the example endotracheal tube support apparatus of FIGS. 34-39.

FIG. 40 illustrates a second disengaged position of the example clamp 928 and support 924, in which the open portion 929 is circumferentially aligned with the groove 972 and therefore the clamp 928 is disengaged with respect to the groove 972 such that a tube in the groove 972 can be removed, adjusted, etc., while tubes in one or both of the grooves 970 and 973 remain secured.

Figure 41:
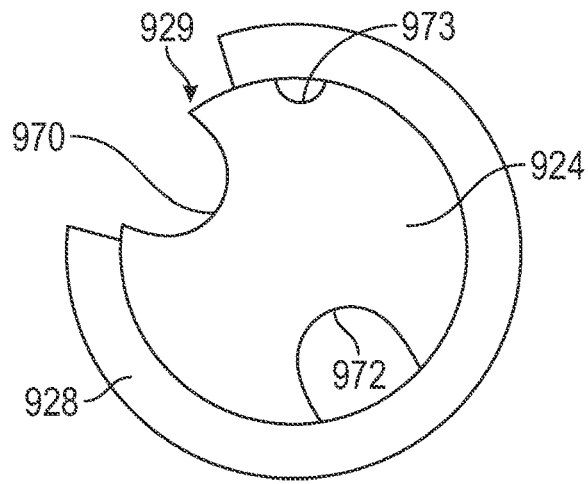
FIG. 41 illustrates a third disengaged position of the clamp and support of the example endotracheal tube support apparatus of FIGS. 34-40.
Figure 42:
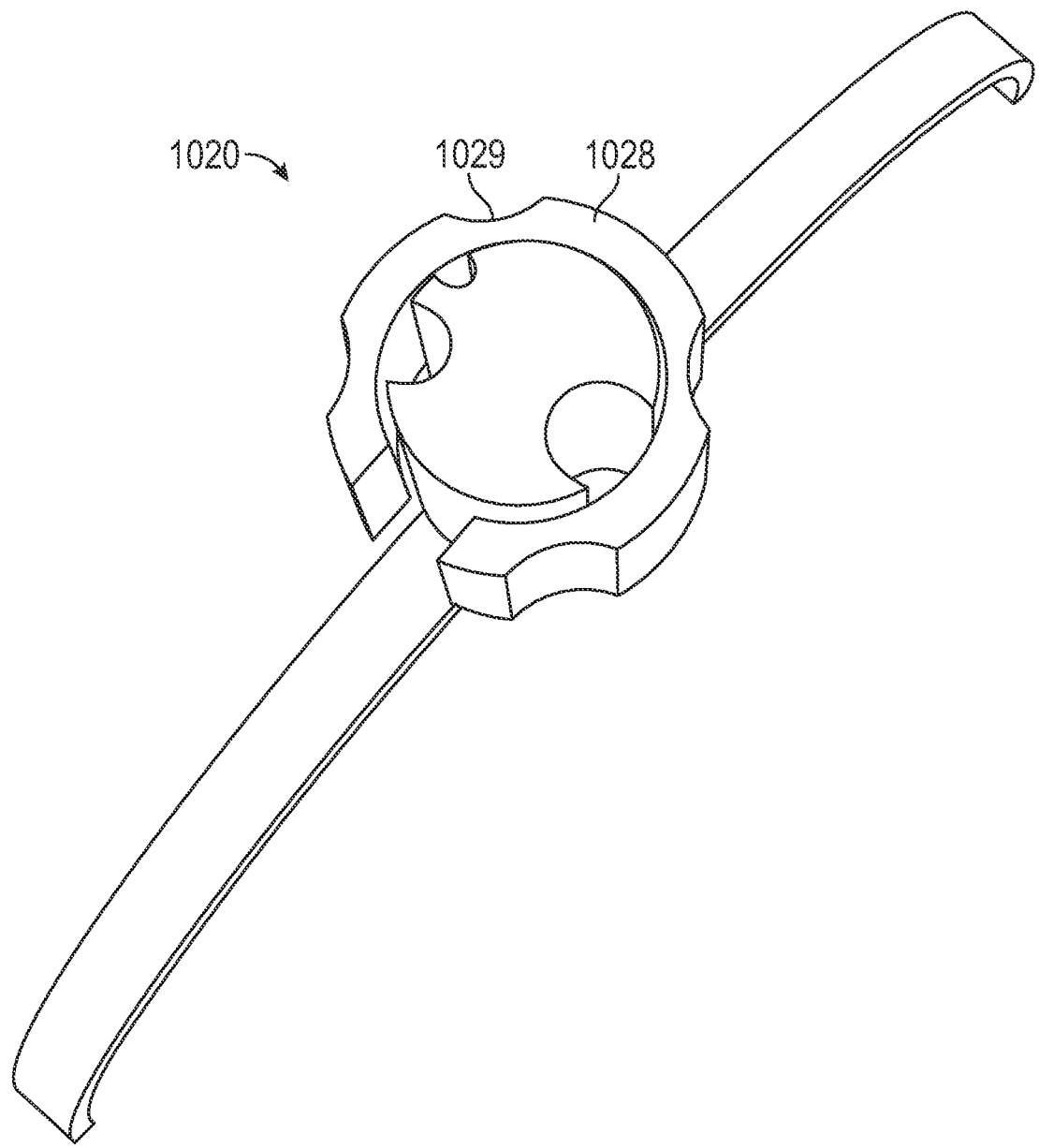
FIG. 42 illustrates another example endotracheal tube support apparatus.
Figure 43:
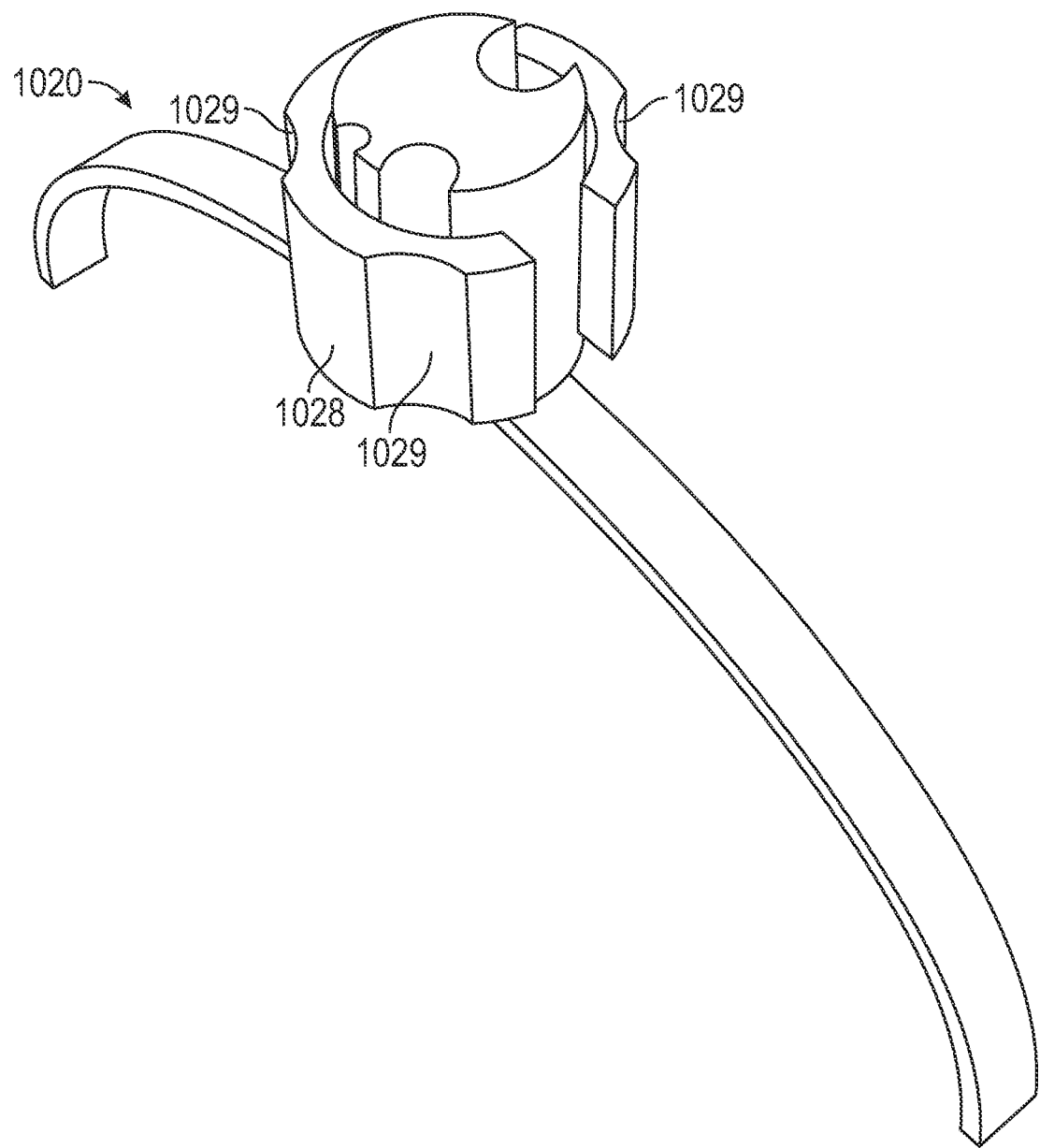
FIG. 43 illustrates the example endotracheal tube support apparatus of FIG. 42.
Figure 44:
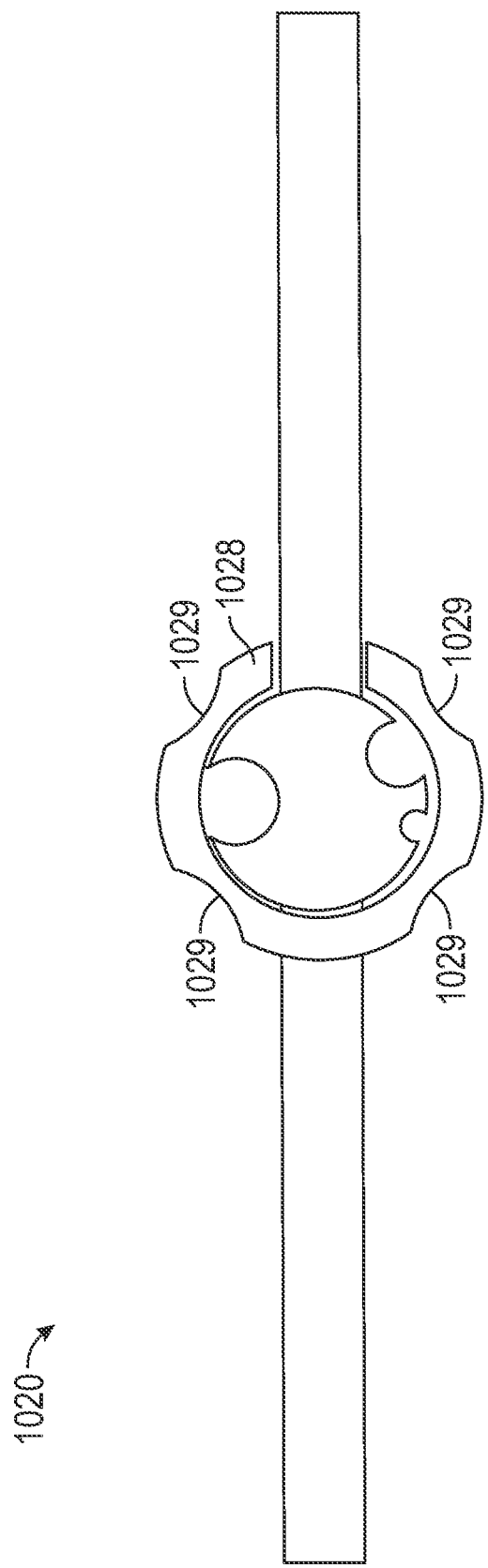
FIG. 44 illustrates the example endotracheal tube support apparatus of FIGS. 42-43.

FIG. 41 illustrates a third disengaged position of the example clamp 928 and support 924, in which the open portion 929 is circumferentially aligned with the groove 970 and therefore the clamp 928 is disengaged with respect to the groove 970 such that a tube in the groove 970 can be removed, adjusted, etc., while tubes in one or both of the grooves 973 and 972 remain secured.

While three grooves 970, 972, and 973 are shown in the examples, more or fewer grooves may be utilized in some examples. In some examples, other clamps could be used with the support 924. In some examples, as shown, the grooves 970, 972, and 973 are of different sizes to accommodate differently sized tubes.

Referring back to FIG. 34, in the example shown, the apparatus 920 including curved portion 925 lies substantially in a plane, and grooves 970, 973 face one side of the plane, and the groove 972 faces an opposite side of the plane (see also FIG. 37). In the orientation shown, one of grooves 970, 973 can receive an orogastric tube, and the groove 972 receives an endotracheal tube. However, in an example in which a nasogastric tube is supported in one of the grooves 970, 973 instead of an orogastric tube, the orientation of the apparatus 920 can be flipped about 180° such that the grooves 970, 973 face the side of the plane that is nearer the nose. The example apparatus 1020 discussed below has similar capability, and is further illustrated at FIGS. 48A and 48B. In some examples, as shown, the groove 973 is closer circumferentially to the groove 970 than to the groove 972.

Figure 47:
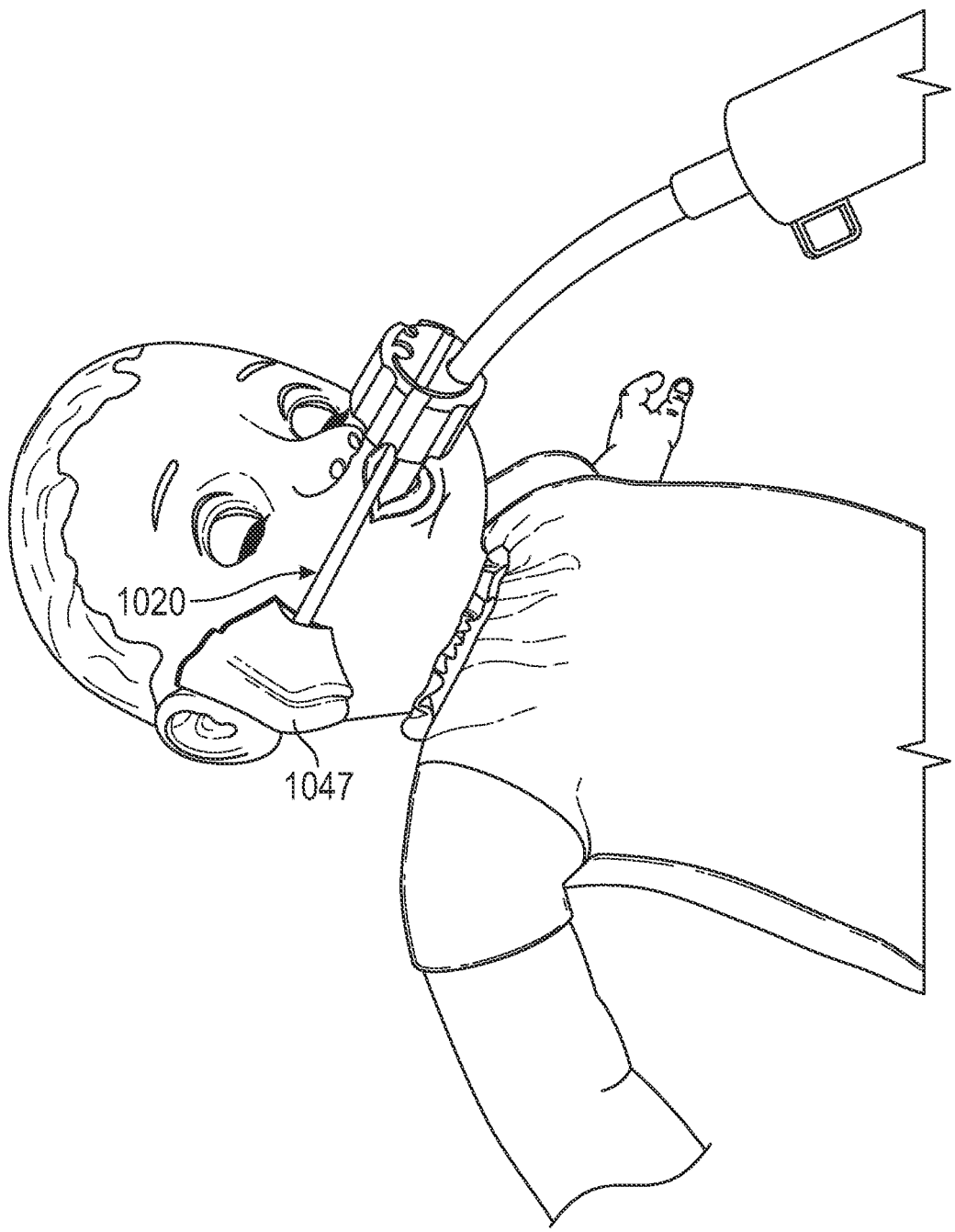
FIG. 47 illustrates the example endotracheal tube support apparatus of FIGS. 42-46 utilized on a patient after an endotracheal intubation.
Figure 48A:
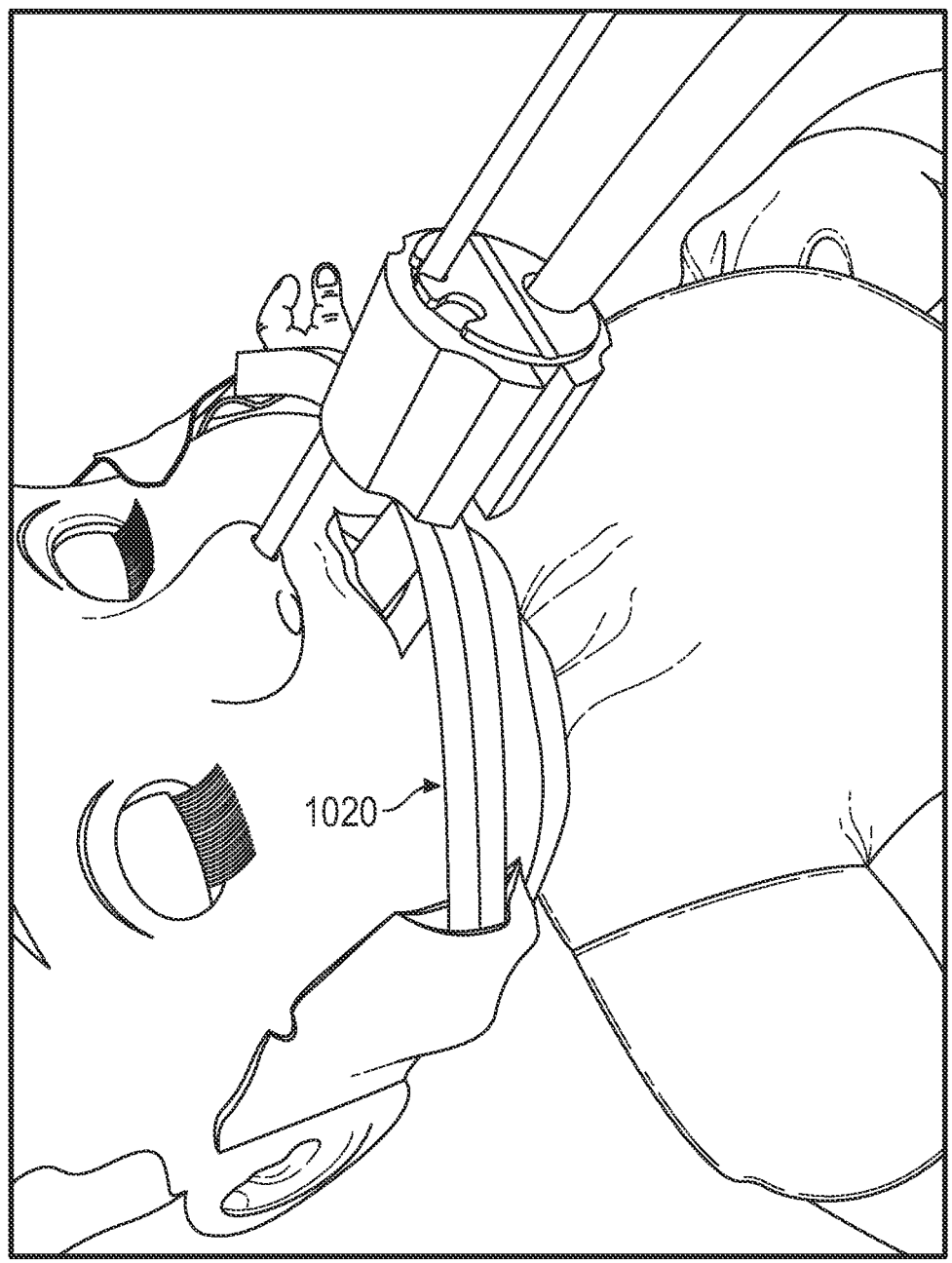
FIG. 48A illustrates the example endotracheal tube support apparatus of FIGS. 42-47 utilized on a patient after an endotracheal intubation and further supporting a nasogastric tube.
Figure 48B:
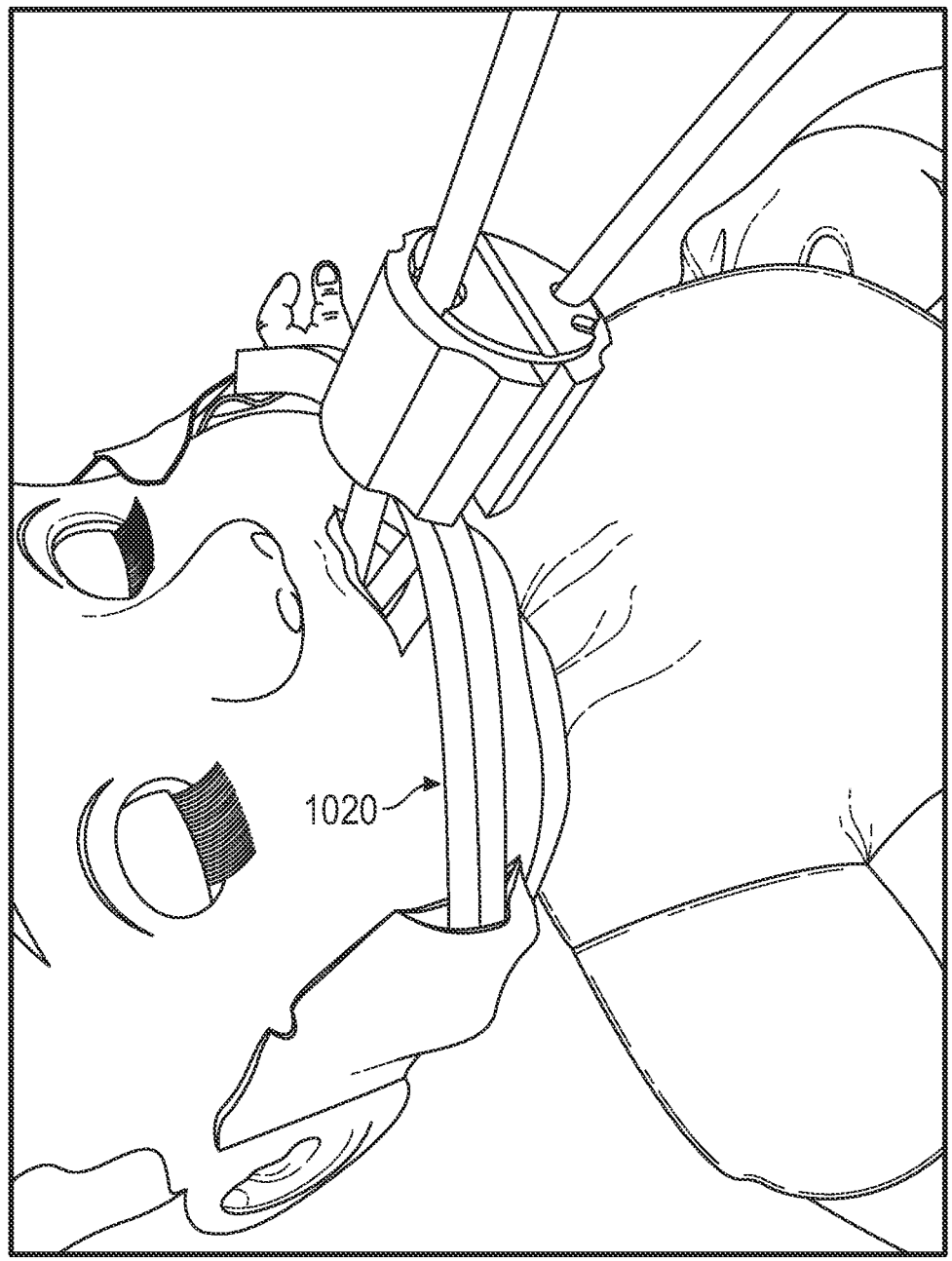
FIG. 48B illustrates the example endotracheal tube support apparatus of FIGS. 42-47 utilized on a patient after an endotracheal intubation and further supporting a orogastric tube and in a flipped orientation to that shown in FIG. 48A.
Figure 49:
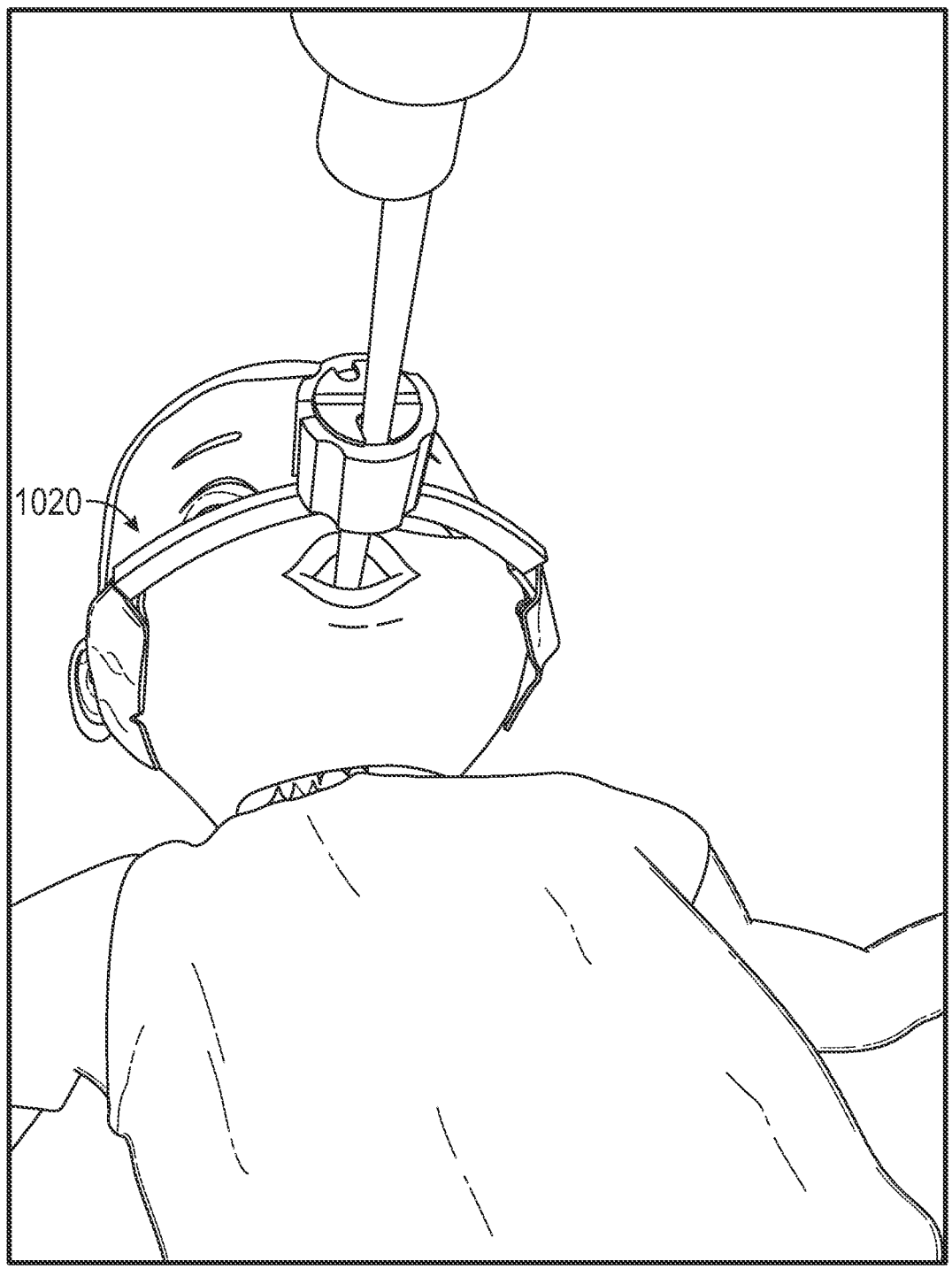
FIG. 49 the example endotracheal tube support apparatus of FIGS. 42-48B utilized on a patient after an endotracheal intubation.

FIGS. 42-49 illustrate another example endotracheal support apparatus 1020, substantially similar to the endotracheal support apparatus, except that the clamp 1028 has outer grooves 1029 on its radially outer surface for ease of grip, such as by medical professionals. FIGS. 47-49 illustrate the example endotracheal support apparatus 1020 positioned on a patient during intubation. In some examples, as shown, the pads 1047 may be tapered like the pads 847 in FIG. 33. FIG. 48A illustrates an orientation of the example apparatus 1020 in which a nasogastric tube is supported. FIG. 48B illustrates an orientation of the example apparatus 1020 flipped 180 degrees from the orientation shown in FIG. 48A in which an orogastric tube is supported.

Figure 50:
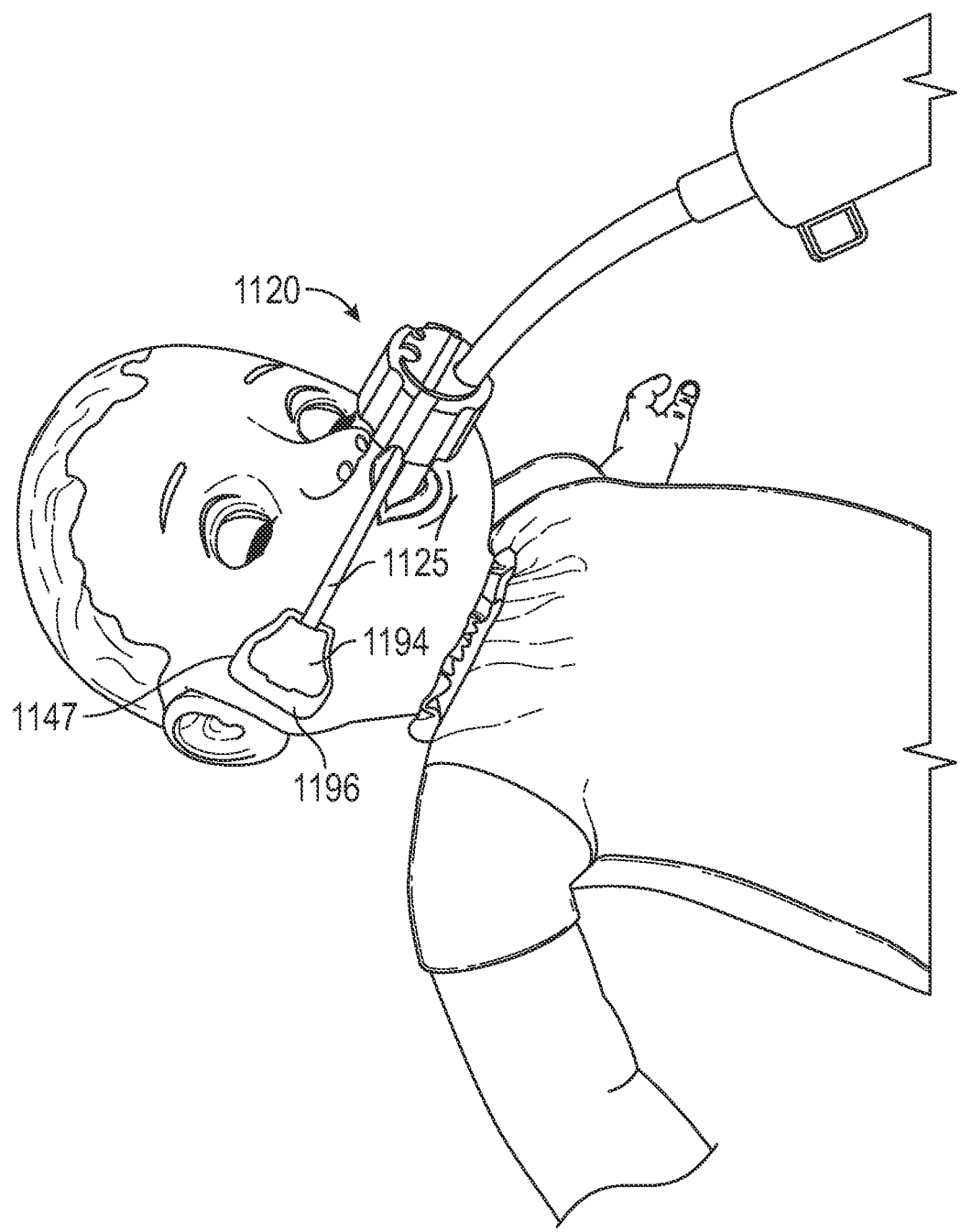
FIG. 50 illustrates another example endotracheal tube support apparatus.

FIG. 50 illustrates another example endotracheal support apparatus 1120 in which the ends of the curved portion 1125 are received in a pad assembly 1147, and more specifically in a receiver pad 1194 adhered to an adhesive pad 1196 adhered to the patient's skin proximal to the ear. In some examples, such as in infants, this area offers the most surface area for adhesion. In some examples, the pad assembly 1147 is adhered in a position closer to the patient's ear than to the patient's mouth. Although one end of the curved portion is shown in one pad assembly 1147 in the Figure, a similar arrangement is utilized proximal to the patient's other ear. In some examples, as shown, both the receiver pad 1194 and the adhesive pad 1196 are tapered, narrowing as they extend in the direction from the patient's ear to the mouth, such as like the tapered pads previously discussed in this disclosure. In some examples, the receiver pad 1194 includes silicon. In some examples, the adhesive pad 1196 is a hydrocolloid pad. Although the example adhesive pad 1196 appears larger than the example receiver pad 1194 for illustrative purposes, in some examples, the adhesive pad 1196 and the receiver pad 1194 are the same size and shape.

Figure 51:
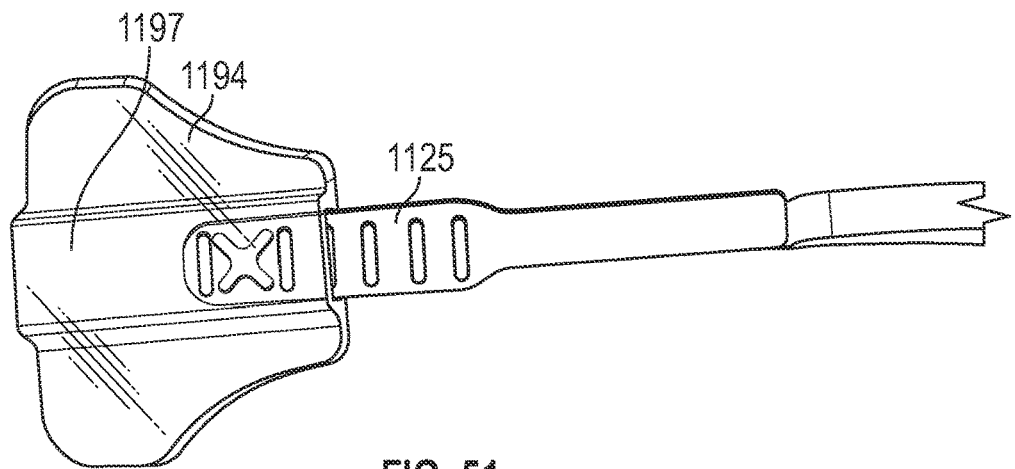
FIG. 51 illustrates a curved portion and receiver pad of the example endotracheal tube support apparatus shown in FIG. 50.
Figure 52:
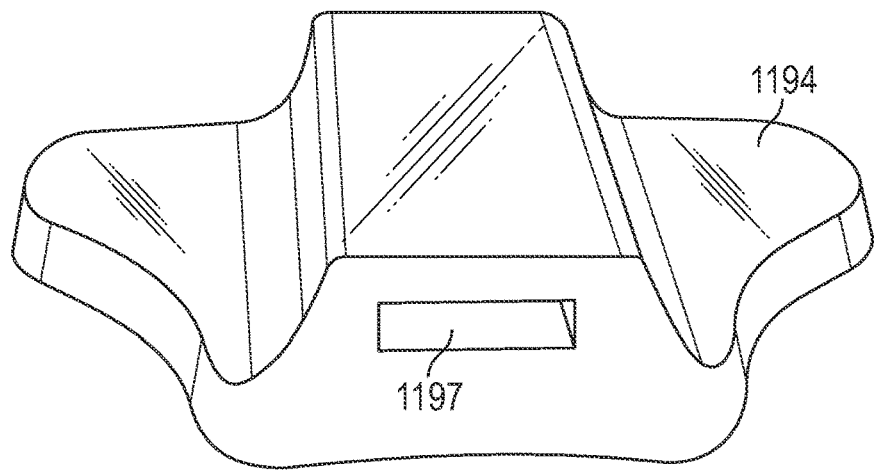
FIG. 52 illustrates the example receiver pad of FIGS. 50 and 51

As shown in FIGS. 51 and 52, the end of curved portion 1125 is received in a channel 1197 of the receiver pad 1194. The end of the curved portion 1125 is adjustable within the channel 1197 to allow the example endotracheal support apparatus 1120 to be placed in an optimal position.

Figure 53:
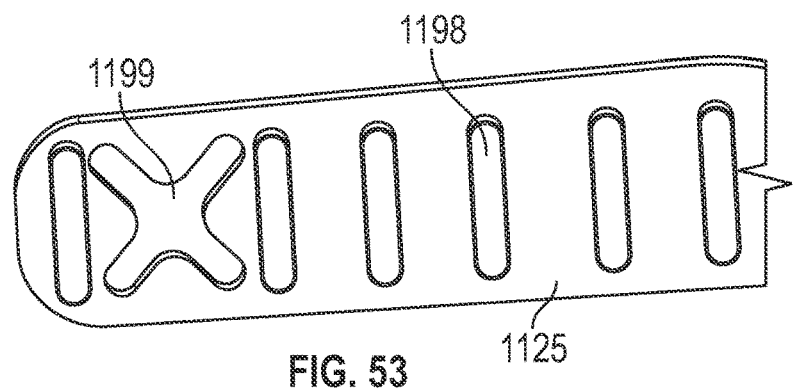
FIG. 53 illustrates an end of the example curved portion.
Figure 54:
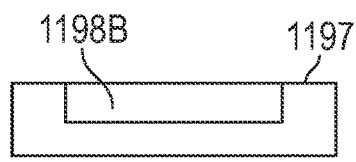
FIG. 54 schematically illustrates a protrusion in the channel of the receiver pad shown in FIGS. 50-52.

As shown in FIG. 53, the curved portion 1125 may include protrusions 1198, such as ribs in some examples for securement of the curved portion 1125 within the channel 1197 (FIGS. 51 and 52). In some examples, as shown schematically in FIG. 54 the channel 1197 may include one or more similar protrusions 1198B, such as on its upper surface in some examples, for engaging with protrusions 1198 on the curved portion 1125 and securing the curved portion 1125 in position once an optimal position is attained. An indicator 1199 may be included on the curved portion 1125 to signal to a medical professional when to stop pulling the curved portion 1125 out of the channel 1197 during an adjustment process to prevent the medical professional from pulling the curved portion 1125 completely out of the channel 1197.

Regarding the example endotracheal support apparatus 1120 or other apparatus that use the pads 1147, in an emergency, the brace can simply be pulled up and out of the pads 1147. The pads 1147 can remain on the patient's face until the emergency has been resolved. The brace can then be replaced into the pads 1147 and reused. This is an improvement over some prior art devices which suggest the device be cut with scissors and pulled off the patient's face. Further, the example pads 1147 are able to be cleaned with baby wipe or alcohol pad. Prior art pads could become soiled with vomit and/or saliva because they are cotton-topped and the whole apparatus would have to be changed out.

With reference to FIGS. 50-53, an example method may include one or more of the following steps: intubating a patient, placing a pad assembly 1147 on the patient's cheek proximal to the patient's ear, placing a second pad assembly 1147 on the patient's cheek proximal to the patient's other ear, positioning the ends of the curved portion 1125 within the channels 1197 of each pad assembly 1147, adjusting the ends of the curved portion 1125 within the channels 1197 of each pad assembly 1147 to an optimal brace position, and securing the endotracheal tube within the example endotracheal support apparatus 1120. Although an example endotracheal support apparatus 1120 is shown, other apparatuses, including other examples in this disclosure, may be utilized with the pad assembly 1147. In some examples, there is no need for an additional adhesive to be placed over the top of the receiver pad 1194.

Figure 45:
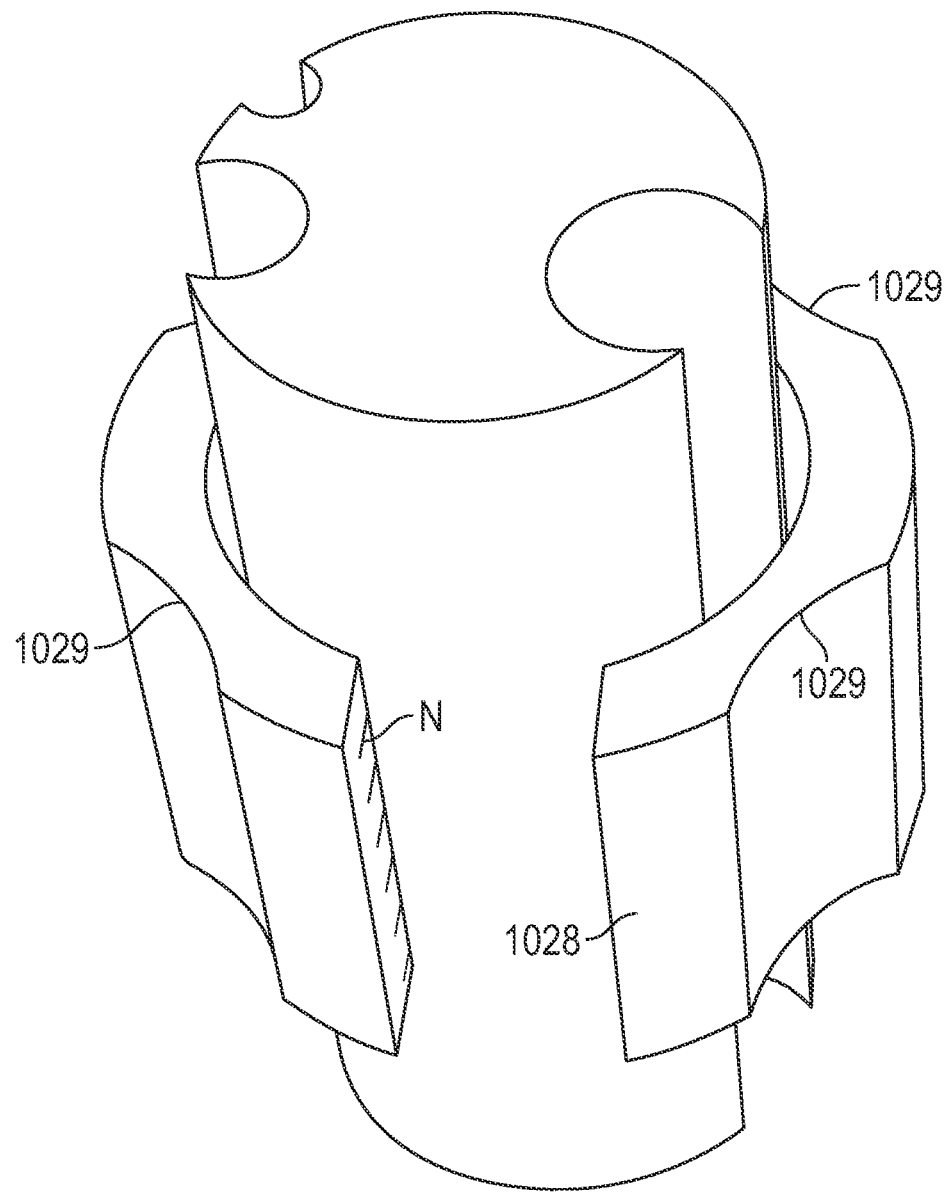
FIG. 45 illustrates the support and clamp of the example endotracheal tube support apparatus of FIGS. 42-44.
Figure 46:
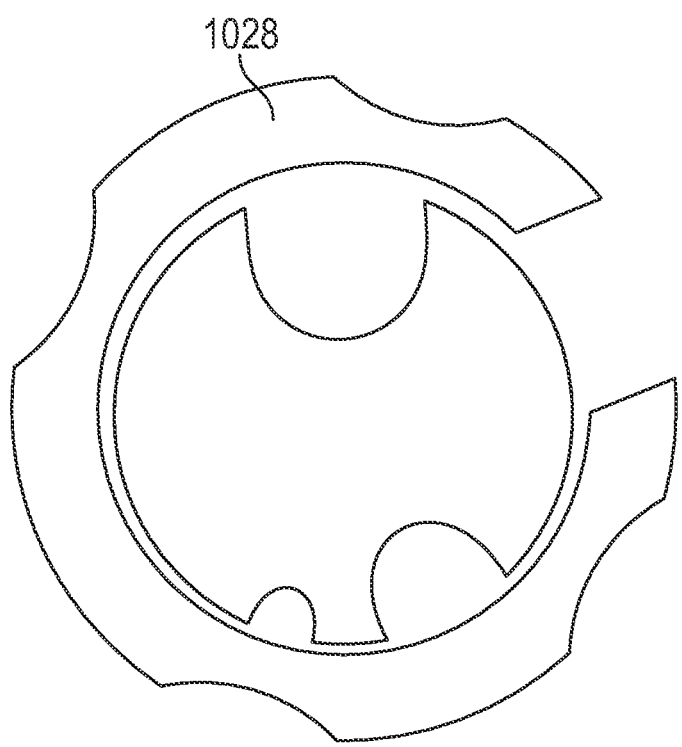
FIG. 46 illustrates the support and clamp of the example endotracheal tube support apparatus of FIGS. 42-44.

In some examples, the grooves receiving the tubes may have indicators, such as notches or raised portions in some examples, for reference against the tubes for adjustment and positioning of the tubes. In some examples, the indicators may be spaced apart in equal intervals. In some examples, the intervals may be 0.25 cm. In some examples, as shown in FIG. 45, one or both of the circumferentially outer surfaces of the clamps 928/1028 may have notches N spaced apart in the same or different intervals for adjustment precision.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An endotracheal tube support apparatus, comprising:
   a brace for attachment to a face of a patient;
   a support extending from the brace and including a first groove for receiving an endotracheal tube and a second groove for receiving a second tube; and
   a generally C-shaped clamp for surrounding the support and the endotracheal tube, the clamp including an open circumferential portion having an arc length greater than or equal to an arc length of a largest groove of the first and second grooves, and less than an arc length of at least one radially outer surface of the support,
   wherein the first and second grooves are positioned such that the clamp can be selectively rotated in a clockwise or counterclockwise direction to circumferentially align the open circumferential portion with either of the first groove and the second groove, thereby allowing one of the endotracheal tube and the second tube to be adjusted or replaced while the other of the endotracheal tube and the second tube remains secured by the clamp against longitudinal movement.

2. The apparatus as recited in claim 1, wherein the clamp includes a plastic body.

3. The apparatus as recited in claim 1, wherein the second tube is a feeding tube or a gastric suction tube.

4. The apparatus as recited in claim 1, wherein the support includes a third groove, and the first, second, and third grooves are sized differently, and the third groove is closer circumferentially to the second groove than the first groove.

5. The apparatus as recited in claim 1, wherein the open circumferential portion is sized such that it is circumferentially aligned with a radially outer surface of the support when the endotracheal and second tubes are secured by the clamp against longitudinal movement in the first and second grooves.

6. The apparatus as recited in claim 1, wherein an inner surface of the clamp is received against an outer surface of the endotracheal tube when the endotracheal tube is secured.

7. The apparatus as recited in claim 1, further comprising cheek pads configured for attachment to the face, each cheek pad including a channel configured to receive an end portion of the brace.

8. The apparatus as recited in claim 7, wherein the channel includes one or more protrusions for engaging corresponding protrusions on the brace to retain the brace in position.

9. The apparatus as recited in claim 1, wherein the clamp comprises a polymeric material.

10. A method of intubating a patient, the method comprising:
    attaching a brace to a face of the patient, wherein the brace includes a support extending away from the face, and having a first groove for receiving an endotracheal tube and a second groove for receiving a second tube;
    clamping the endotracheal tube within the first groove of the support with a generally C-shaped clamp that surrounds the endotracheal tube and the support, the clamp including an open circumferential portion having an arc length greater than or equal to an arc length of a largest groove of the first and second grooves and less than an arc length of at least one radially outer surface of the support; and
    adjusting or replacing one of the endotracheal tube and the second tube while the other of the endotracheal tube and the second tube remains secured, wherein the first and second grooves are positioned such that the clamp is rotatable in a clockwise or counterclockwise direction to circumferentially align the open circumferential portion with either of the first and second groove, wherein the adjusting or replacing includes rotating the clamp in a clockwise or counterclockwise direction.

11. The method as recited in claim 10, wherein the second tube is a feeding tube or a gastric suction tube, the method further comprising clamping the second tube within the second groove with the clamp.

12. The method as recited in claim 10, wherein the open circumferential portion is sized such that it is circumferentially aligned with a radially outer surface of the support when the endotracheal and second tubes are secured by the clamp against longitudinal movement in the first and second groove.

13. The method as recited in claim 10, the method comprising clamping the second tube within the second groove with the clamp.

14. The method as recited in claim 10, further comprising attaching cheek pads to the face, each cheek pad including a channel, and inserting end portions of the brace into the respective channels.

15. The method as recited in claim 14, wherein inserting the end portions includes sliding the end portions of the brace within the channels to adjust the position of the brace on the face.

16. The method as recited in claim 15, wherein the channels include one or more protrusions that engage corresponding protrusions on the brace to retain the brace in position after adjustment.

17. The method as recited in claim 10, wherein the clamp comprises a polymeric material.

18. An endotracheal tube support apparatus, comprising:
a first cheek pad configured for attachment to a face of a patient and including a first channel;
a second cheek pad configured for attachment to a face of a patient and including a second channel;
a brace having first and second end portions to be received in the first and second channels;
a support extending from the brace and including a first groove for receiving an endotracheal tube and a second groove for receiving a second tube; and
a single clamp movable between a first position in which the endotracheal tube and the second tube are secured against longitudinal movement within the first groove and the second groove, a second position in which the endotracheal tube is secured against longitudinal movement within the first groove and the second tube is longitudinally adjustable within the second groove and removable from the second groove while the endotracheal tube is secured, and a third position in which the second tube is secured against longitudinal movement within the second groove and the endotracheal tube is longitudinally adjustable within the first groove and removable from the first groove while the second tube is secured.

19. The apparatus of claim 18, wherein each of the first and second channel includes one or more protrusions for engaging corresponding protrusions on the brace to retain the brace in position.

20. The apparatus as recited in claim 18, wherein the clamp is generally C-shaped and includes an open circumferential portion, the open circumferential portion being circumferentially aligned with a radially outer portion of the support in the first position, with the second groove in the second position, and with the first groove in the third position.

* * * * *